(12) United States Patent
El-Hibri et al.

(10) Patent No.: US 10,519,277 B2
(45) Date of Patent: Dec. 31, 2019

(54) POLY(ARYL ETHER) COMPOSITIONS FOR POLYMER-METAL JUNCTIONS AND POLYMER-METAL JUNCTIONS AND CORRESPONDING FABRICATION METHODS

(71) Applicant: SOLVAY SPECIALTY POLYMERS USA, LLC, Alpharetta, GA (US)

(72) Inventors: Mohammad Jamal El-Hibri, Atlanta, GA (US); Chantal Louis, Alpharetta, GA (US); Ryan Hammonds, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 15/534,313

(22) PCT Filed: Dec. 11, 2015

(86) PCT No.: PCT/EP2015/079468
§ 371 (c)(1),
(2) Date: Jun. 8, 2017

(87) PCT Pub. No.: WO2016/092087
PCT Pub. Date: Jun. 16, 2016

(65) Prior Publication Data
US 2017/0362379 A1   Dec. 21, 2017

Related U.S. Application Data

(60) Provisional application No. 62/090,901, filed on Dec. 12, 2014.

(51) Int. Cl.
| | |
|---|---|
| *H01B 7/00* | (2006.01) |
| *C08G 65/40* | (2006.01) |
| *C08J 5/12* | (2006.01) |
| *H01B 3/30* | (2006.01) |
| *H01B 3/42* | (2006.01) |
| *C09D 171/08* | (2006.01) |
| *C08L 71/08* | (2006.01) |
| *C08G 75/23* | (2006.01) |
| *H01B 7/02* | (2006.01) |
| *H01B 7/18* | (2006.01) |
| *H01B 13/06* | (2006.01) |

(52) U.S. Cl.
CPC ......... *C08G 65/4012* (2013.01); *C08G 65/40* (2013.01); *C08G 75/23* (2013.01); *C08J 5/124* (2013.01); *C08L 71/08* (2013.01); *C09D 171/08* (2013.01); *H01B 3/301* (2013.01); *H01B 3/427* (2013.01); *H01B 7/0216* (2013.01); *H01B 7/18* (2013.01); *H01B 13/06* (2013.01); *C08G 2650/40* (2013.01); *C08J 2371/00* (2013.01); *C08J 2371/10* (2013.01); *C08J 2481/06* (2013.01)

(58) Field of Classification Search
CPC ...... H01B 1/026; H01B 3/36; H01B 13/0858; C08G 3/36; C08G 2650/40; H02K 3/02; H02K 3/30
USPC .... 174/110 R–110 E, 120 R, 120 SR, 121 R, 174/121 SR
See application file for complete search history.

(56) References Cited

U.S. PATENT DOCUMENTS

| | | | | |
|---|---|---|---|---|
| 4,503,121 A | * | 3/1985 | Robeson | B29D 11/0073 126/569 |
| 4,616,056 A | * | 10/1986 | Chan | C08G 61/127 524/170 |
| 5,173,542 A | * | 12/1992 | Lau | C07C 245/24 257/E23.077 |
| 5,264,538 A | * | 11/1993 | Mullins | C07C 45/46 528/125 |
| 5,270,453 A | * | 12/1993 | Lau | C07C 245/24 257/E23.077 |
| 5,783,867 A | * | 7/1998 | Belke | H01L 21/563 257/782 |
| 6,191,252 B1 | * | 2/2001 | Jensen | C08G 65/4012 264/232 |

(Continued)

FOREIGN PATENT DOCUMENTS

| | | | | |
|---|---|---|---|---|
| EP | 2669896 A1 | 12/2013 | | |
| WO | WO86/04079 | * | 7/1986 | C08L 69/00 |

(Continued)

OTHER PUBLICATIONS

Jin Xigao et al., "A sulphonated poly(aryl ether ketone)", Brit. Polymer Journal, 1985, vol. 17, p. 4-10—doi: 10.1002/pi. 4980170102.

*Primary Examiner* — William H. Mayo, III
(74) *Attorney, Agent, or Firm* — Jarrod N. Raphael; Helene Fiorucci

(57) ABSTRACT

Adhesive compositions are described that significantly improve the adhesion of polymer overmold compositions to metal substrates in polymer-metal junctions. The adhesive compositions include one or more poly(aryl ether) polymers, where each of the poly(aryl ether) polymers is, independently, a poly(aryl ether sulfone) polymer or a poly(aryl ether ketone) polymer. The overmold composition includes at least one poly(aryl ether ketone) polymer. Polymer-Metal junctions can be formed by, for example, dip-coating, spin-coating, extruding, or injection molding the adhesive composition and/or the overmold composition onto the metal substrate. Desirable applications settings for the polymer-metal junctions described include, but are not limited to electrical wiring.

19 Claims, No Drawings

(56) References Cited

U.S. PATENT DOCUMENTS

| | | | |
|---|---|---|---|
| 7,750,091 B2* | 7/2010 | Maljkovic | C08L 65/02 525/390 |
| 2005/0154178 A1* | 7/2005 | Bender | C08G 65/40 528/80 |
| 2006/0057380 A1 | 3/2006 | Weinberg et al. | |
| 2007/0292731 A1* | 12/2007 | Gao | B01D 71/52 528/373 |
| 2009/0234060 A1* | 9/2009 | Haralur | C08L 71/00 524/539 |
| 2011/0206880 A1* | 8/2011 | Wang | C08G 65/4037 428/36.9 |
| 2014/0186624 A1* | 7/2014 | Sriram | C09D 171/00 428/398 |
| 2015/0368380 A1* | 12/2015 | Kreyenschmidt | C08F 12/28 424/78.32 |

FOREIGN PATENT DOCUMENTS

| | | | | |
|---|---|---|---|---|
| WO | 2014037374 A1 | 3/2014 | | |
| WO | 2014072447 A1 | 5/2014 | | |
| WO | WO 2014/072447 | * | 5/2014 | C08L 71/00 |

\* cited by examiner ties are well known for their high chemical and thermal stability. However, there remains a need for improved adhesion of poly(aryl ether) compositions to metal substrates.

POLY(ARYL ETHER) COMPOSITIONS FOR POLYMER-METAL JUNCTIONS AND POLYMER-METAL JUNCTIONS AND CORRESPONDING FABRICATION METHODS

CROSS REFERENCE TO RELATED APPLICATIONS

This application claims priority to U.S. Provisional Application No. 62/090,901, filed Dec. 12, 2014, which is incorporated by reference herein in its entirety.

FIELD OF THE INVENTION

The invention relates to adhesive compositions including one or more poly(aryl ether) polymers. The invention also relates to polymer-metal junctions including overmold compositions having one or more poly(aryl ether ketone) polymers, adhesive compositions including one or more poly(aryl ether) polymers, and metal substrates.

BACKGROUND

The metal-polymer junction is ubiquitous interface in a wide variety of application settings. For example, in plumbing, overmolded inserts can provide for connections and fluid flow passageways between different plumbing fixtures (e.g., pipes). As another example, in electrical wiring applications, polymeric sheaths are formed around the electrically conductive metal core to provide abrasion protection, corrosion protection, and dielectric insulation to the underlying conductive core. As a further example, in mobile electronic devices (e.g. mobile phones and tablets), polymer materials are highly desirable due to their light weight and strength, relative to metal compositions. Correspondingly, many mobile electronic devices incorporate polymer housings (e.g., cases) or polymer supports for internal electronic components into their designs, to reduce weight while providing desirable levels of strength and flexibility. Accordingly, application settings involving metal-polymer junction designs rely heavily on the strength of the metal-polymer junction.

SUMMARY

In a first aspect, the invention relates to a polymer-metal junction. The polymer-metal junction includes a polymer composition disposed over a surface of a metal substrate. The polymer-metal junction further includes a second adhesive composition disposed between the polymer composition and the metal surface and in contact with the polymer composition and the surface of the metal substrate. The polymer composition comprises a first poly(aryl ether ketone) and the adhesive composition comprises a poly(aryl ether).

In a second aspect, the invention relates to a method for providing improved adhesion between a polymer composition and a metal substrate. The method includes depositing an adhesive compositions including a poly(aryl ether) on a surface of a metal substrate, to form a first deposit. The method further includes depositing a polymer composition including a first poly(aryl ether ketone) on the first deposit, to form a second deposit.

DETAILED DESCRIPTION

Adhesive compositions including one or more poly(aryl ether) polymers are described herein that significantly improve the adhesion between polymer overmold compositions and metal substrates at polymer-metal junctions. In particular, it has been surprisingly discovered that adhesive compositions including one or more poly(aryl ether sulfone) ("PAES") polymers or one or more poly(aryl ether ketones) ("PAEK") polymers can significantly improve the adhesion of overmold compositions, also including a PAEK polymer, to metal substrates. For clarity, poly(aryl ether ketone) polymers in the adhesive compositions are referred to as PAEK1 and poly(aryl ether ketone) polymers in the overmold compositions are referred to as PAEK2. In some embodiments, the metal substrates can be pre-treated to provide for additional adhesive strength between the metal and the overmold composition. The adhesive compositions described herein can be coated onto a metal substrate (or a portion thereof) and an overmold composition can be deposited onto the adhesive composition using methods known in the art. In some embodiments, the polymer-metal junctions described herein can be desirably incorporated into electrical wiring.

The adhesive compositions of interest herein include one or more poly(aryl ether) polymers and, optionally, one or more additives, as described in detail below. In particular, each of the one or more poly(aryl ether) polymers can be, independently, a PAES polymer or a PAEK1 polymer, as described in detail below. In some embodiments, the adhesive composition can optionally, further include one or more additives, distinct from the PAES polymer and PAEK1 polymer. As used herein, a poly(aryl ether) polymer refers to any polymer of which more than 50 weight percent ("wt. %") of the recurring units ("$R_{PE}$") include at least one arylene group and at least one ether group (—O—). The poly(aryl ether) polymers of interest herein have a weight average molecular weight ("Mw") of at least about 1000 g/mol, at least about 2000 g/mol, at least about 3000 g/mol, at least about 4000 g/mol, at least about 5000 g/mol or at least about 6000 g/mol. Mw can be expressed as follows:

$$M_W = \frac{\sum_i M_i^2 N_i}{\sum_i M_i N_i},$$

where $N_i$ is the number of polymer molecules with molecular weight $M_i$.

It has been surprisingly found that the adhesive compositions described herein can significantly improve the adhesion of overmold compositions, including a PAEK2 polymer, to metal substrates. In particular, it has been found that adhesion of PAEK2 overmold compositions to metal substrates can be significantly improved with the use of adhesive compositions including one or more PAES polymers, one or more PAEK1 polymers or a combination thereof. In some embodiments, a polymer-metal junction can have a lap shear stress at failure of at least about 700 pounds per square inch ("psi"), at least about 800 psi, at least about 1000 psi, at least about 1200 psi, at least about 1400 psi, at least about 1600 psi, or at least about 1800 psi, or at least about 2000 psi, as measured by the ASTM D1002 standard at room temperature and using a grip distance of 3.5 inches. In some embodiments, the lap shear at failure can be due to fracture of the bulk overmold composition. In other words, in such embodiments, the joint between the overmold composition is left structurally intact while the bulk overmold composition fractures, suggesting that the strength of the joint is greater than that of the bulk overmold composition.

The overmold compositions described herein include one or more PAEK2 polymers and, optionally, one or more additional polymers or additives distinct from the PAEK2 polymers and the additional polymers. In some embodiments in which the adhesive composition comprises one or more PAEK1 polymers, the one or more PAEK2 polymers are distinct from the one or more PAEK1 polymers. In other such embodiments, at least one of the one or more PAEK1 polymers and at least one of the one or more PAEK2 polymers are distinct. Desirable PAEK2 polymers are those described below with respect to PAEK1 polymers. In some embodiments, one, some or all of the PEAK2 polymers are poly(ether ether ketone) ("PEEK") polymers. In some embodiments, the overmold composition can include at least about 20 wt. %, at least about 30 wt. %, at least about 40 wt. %, at least about 50 wt. %, at least about 60 wt. %, at least about 70 wt. %, at least about 80 wt. %, at least about 90 wt. % or at least about 95 wt. % of the one or more PAEK2 polymers, relative to the total weight of the overmold composition. In some embodiments, the overmold composition can include at least about 99.99 wt. % of the one or more PAEK2 polymers, relative to the total weight of the overmold composition.

The additional polymers can include, but are not limited to, a polysulfone ("PSU") polymer, a poly(ether sulfone) ("PESU") polymer, a poly(phenyl sulfone) ("PPSU") polymer or any combination thereof. The PSU, PESU and PPSU polymers can be synthesized by methods known in the art. Desirable PSU and PPSU compositions are commercially available as Udel® PSU and Radel® PPSU, respectively, from Solvay Specialty Polymers USA, LLC. Desirable PESU composition are available as Virantage® PESU and Veradel® PESU, from Solvay Specialty Polymers USA, LCC. As used herein, PESU refers to any polymer of which at least 50 wt. % of the recurring units are recurring units ($R_{PSb}$) of formula (I-1):

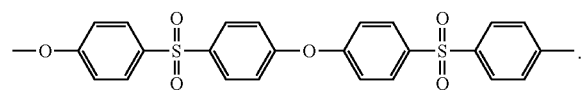
(I-1)

In some embodiments, at least about 75 wt. %, at least about 85 wt. %, at least about 95 wt. % or at least about 99 wt. % of the recurring units of the PESU are recurring units ($R_{PSb}$) of formula (I-1). In some embodiments, the PESU consists essentially of recurring units ($R_{PSb}$) of formula (I-1). PESU can be prepared by methods known to the person of ordinary skill in the Art.

The PAEK1 polymers of the adhesive composition and the PAEK2 polymers of the overmold composition can be, independently, crystalline, semicrystalline or amorphous. In some embodiments, it has been found that adhesive compositions including at least one amorphous PAEK1 polymer can further improve the adhesion of the overmold compositions to metal substrates. In general, a PAEK composition (e.g. adhesive or overmold composition) having at least one amorphous PAEK polymers can also facilitate solution casting or dip-coating of the composition onto a substrate, relative to PAEK compositions having crystalline or semicrystalline polymers.

The additives in the adhesive and overmold compositions can include, but are not limited to, a colorant (e.g., a dye and/or a pigment), ultraviolet light stabilizers, heat stabilizers, antioxidants, reinforcing fillers, an acid scavenger, processing aids, nucleating agents, an internal lubricant and/or an external lubricant, flame retardants, a smoke-suppressing agent, an anti-static agent, an anti-blocking agent, a conductivity additive (e.g., carbon black and carbon nanofibrils) or any combination thereof. Additives are discussed in detail below.

The form and composition of the metal substrate can be selected based upon the desired application setting. For example, the metal substrate can be, but is not limited to, a connector designed to be used in a housing formed from the overmold composition (e.g., a plumbing connector; tool handle connector; a shaft collar or the like). In some embodiments, the metal substrate can be an electrically or thermally conductive element (e.g., an electrically conductive metallic core of an electrical wire) designed for use with an insulating housing (e.g., an antenna housing; a temperature probe housing; or an electrical wiring housing). In some embodiments, the metal substrate can have threads on an interior surface to facilitate connection of the insert to another article (e.g., another connector or a shaft). The metal substrate can include, or consist essentially of, aluminum, copper, iron, stainless steel, zinc, nickel, or any blend or alloy therefore (e.g. brass). In some embodiments, at least a portion of one or more surfaces of the metal substrate can be pre-treated to increase its surface area and, thereby, further promoting adhesion of the adhesive compositions or the overmold composition to the substrate. For example, at least a portion of a surface of a metal substrate can be roughened to promote adhesion of the adhesive or overmold compositions to the surface of the substrate. In some embodiments, roughening can include etching (e.g. chemical etching or laser etching), mechanical grinding, or any combination therefore. In some embodiments, the adhesive composition can be deposited on at least a portion of the roughened surface and the overmold composition can deposited over at least a portion of the deposited adhesive composition. In some embodiments, the adhesive compositions described herein significantly improve adhesion of the overmold composition to the metal substrate without roughening the substrate surface.

The metal-polymer junctions of interest herein can be fabricated by methods known in the art. In general, fabrication of metal polymer junctions involves deposition of the adhesive composition onto at least a portion of the metal substrate and deposition of the overmold composition onto at least a portion of the adhesive composition. The adhesive composition and the overmold composition can each independently be deposited by a method selected from injection molding, blow molding, dip-coating, co-extrusion and any combination thereof. In some embodiments, the adhesive composition is deposited onto at least a portion of the surface of an metal substrate to form a layer. In such embodiments, the overmold composition can be deposited onto at least a portion of the deposited adhesive composition. In some embodiments, the adhesive composition and the overmold composition can be simultaneously (or nearly simultaneously) deposited on the metal substrate (e.g. by co-extrusion). In some embodiments, the overmold composition can form a housing around the metal substrate. For example, in some such embodiments, the overmold composition can be, but is not limited to, a plumbing fixture (e.g. a valve, a manifold, a pipe), an impeller or a tool handle or an electrical wire sheath (e.g. the dielectric insulator surrounding the conductive metal core). In some embodiments, the adhesive composition is deposited as a layer covering at least a portion of the substrate. In such embodiments, the layer can have an average thickness from about 1 µm to about 1 mm, from about 50 µm to about 800 µm, from about 100 µm to about 800 µm, from about 100 µm to about 600 µm, or from about 150 µm to about 600 µm.

In some embodiments, the polymer-metal junctions described herein can be desirably incorporated into electrical wiring applications. As discussed above, electrical wires generally include a metal core surrounded by a protective sheath. The metal core can include any desirable electrically conductive metallic composition including, but not limited to, aluminum, copper, gold, iron, nickel, platinum, silver, steel, and blends or alloys thereof (e.g., brass and bronze). The metal core can be a solid core (e.g., single strand wire), stranded core, or braided core. In some embodiments, the core can be cylindrical along its lengths or a portion thereof. The protective sheath generally surrounds the core, or a portion thereof, and provides electric insulation (e.g., wherein the protective sheath has a dielectric composition), chemical resistance (e.g., corrosion resistance), physical resistance (e.g., abrasion resistance) or any combination thereof, to the underlying core. With respect to the polymer-metal junctions described herein, the substrate can be the metal core and the overmold composition can be the sheath. In such embodiments, the adhesive compositions can provide for improved adhesion between the sheath and the core. In particular, the adhesive composition can be disposed between the metallic core and the sheath to improve adhesion there between. In some embodiments, the adhesive composition can surround the metallic core and, in other embodiments, the adhesive composition does not fully surround the metallic core. In some embodiments, the sheath can surround the length of the core or a portion thereof. In some embodiments, the adhesive composition can be disposed between core and the sheath along the length of the sheath or a portion thereof. In some embodiments, the electrical wire can be desirably formed by co-extruding the adhesive composition and the overmold composition (e.g. sheath) onto the metal substrate (e.g. metallic core).

Adhesive Compositions

The adhesive compositions described herein include one or more poly(aryl ether) polymers. In some embodiments, one or more of the poly(aryl ether) polymers is a PAES polymers or a PAEK polymer. In some embodiments, the adhesive compositions can optionally include one or more additives including, but not limited to, a colorant (e.g., a dye and/or a pigment), ultraviolet light stabilizers, heat stabilizers, antioxidants, reinforcing fillers, an acid scavenger, processing aids, nucleating agents, an internal lubricant and/or an external lubricant, flame retardants, a smoke-suppressing agent, an anti-static agent, an anti-blocking agent, a conductivity additive (e.g., carbon black and carbon nanofibrils) or any combination thereof.

In some embodiments, the adhesive composition can include at least about 20 wt. %, at least about 30 wt. %, at least about 40 wt. %, at least about 50 wt. %, at least about 60 wt. %, at least about 70 wt. %, at least about 80 wt. %, at least about 90 wt. % or at least about 95 wt. % poly(aryl ether) polymers, relative to the total weight of the adhesive composition. In some embodiments, the adhesive composition can include at least about 99.99 wt. % poly(aryl ether) polymers, relative to the total weight of the adhesive composition.

As explained above, it has been surprisingly found that the adhesive compositions described herein can significantly improve the adhesion of overmold compositions, including a PAEK2 polymer, to metal substrates. Moreover, in some embodiments, it has been found that the adhesion of PAEK2 overmold compositions to metal substrates can be further improved when the one or more poly(aryl ether) polymers of the adhesive composition, in total, includes no more than about 25 wt. % [—S(=O)$_2$—] ("sulfone") groups, relative to the total weight of the one or more poly(aryl ether) polymers. In some such embodiments, the one or more poly(aryl ether) polymers of the adhesive composition, in total, includes no more than about 23 wt. %, no more than about 20 wt. %, or no more than about 18 wt. % sulfone groups.

In some embodiments, the adhesive compositions can be further selected to have desirable processing characteristics. Generally, deposition of the adhesive composition involves flowing the adhesive composition onto the metal substrate. In such embodiments, the adhesive composition can be heated to promote flow. In some embodiments, the adhesive compositions described herein can have a 5% weight loss at a temperature ("$T_d$") of no less than about 200° C., no less than about 250° C., or no less than about 300° C., as measured by thermal gravimetric analysis ("TGA") according to the ASTM D3850 standard. TGA measurements are performed with starting temperature of 30° C., an ending temperature of 800° C., a ramp rate of 10° C./minute and under a nitrogen atmosphere using a flow rate of 60 mL/minute.

Poly(Aryl Ether Sulfone)s

In some embodiments, one or more of the poly(aryl ether) polymers can be a PAES polymer. As used herein, PAES refers to any polymer in which at least 50 wt. % of the recurring units are recurring units ($R_{PS}$) including at least one arylene group, at least one ether group (—O—) and at least one sulfone group [—S(=O)$_2$—]. The PAES polymers of interest herein, at least about 60 mole percent ("mol %"), at least about 80 mol %, at least about 90 mol % of the recurring units are recurring units ($R_{PS}$), as described above. In some embodiments, greater than about 99 mol % of the recurring units of the PAES are recurring units ($R_{PS}$), as above detailed.

The arylene group of the PAES polymer can be an aromatic radical having from 6 to 36 carbon atoms, where one or more of the carbon atoms is optionally substituted by at least one substituent selected from the group consisting of a halogen, an alkyl, an alkenyl, an alkynyl, an aryl, an arylalkyl, a nitro, a cyano, an alkoxy, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine and an quaternary ammonium.

In some embodiments, the recurring units ($R_{PS}$) are recurring units of formula (A) as shown below:

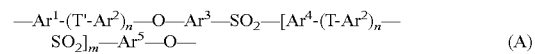

$$—Ar^1\text{-}(T'\text{-}Ar^2)_n—O—Ar^3—SO_2—[Ar^4\text{-}(T\text{-}Ar^2)_n—SO_2]_m—Ar^5—O— \quad (A)$$

where:

Ar$^1$, Ar$^2$, Ar$^3$, Ar$^4$, and Ar$^5$, equal to or different from each other and at each occurrence, are independently an aromatic mono- or polynuclear group;

T and T', equal to or different from each other and at each occurrence, are independently a bond or a divalent group optionally including one or more than one heteroatom;

n and m, equal to or different from each other, are independently zero or an integer from 1 to 5;

In some embodiments, $Ar^1$, $Ar^2$, $Ar^3$, $Ar^4$ and $Ar^5$ are equal or different from each other and having a formula selected from the group consisting of following formulae:

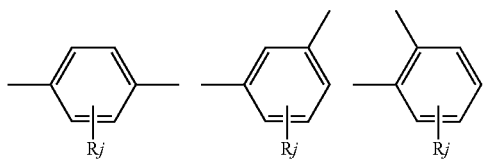

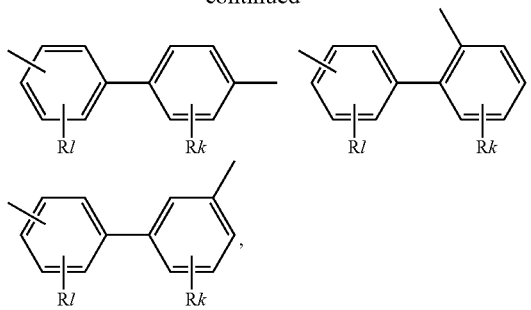

where each R is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and where j, k and l, equal or different from each other, are independently 0, 1, 2, 3 or 4.

In some embodiments, $Ar^2$ may further be selected from the group consisting of fused benzenic rings (e.g., naphthylenes and 2,6-naphthylene), anthrylenes (e.g., 2,6-anthrylene) and phenanthrylenes (e.g., 2,7-phenanthrylene), naphthacenylenes and pyrenylenes groups; an aromatic carbocyclic system including from 5 to 24 atoms, at least one of which is a heteroatom (e.g., pyridines, benzimidazoles, and quinolones). The hetero atom is can be N, O, Si, P or S. In some embodiments, the hetero atom can be N, O or S.

In some embodiments, T and T' of formula (A), equal to or different from each other, are selected from the group consisting of: a bond; —$CH_2$—; —O—; —$SO_2$—; —S—; —C(O)—; —C($CH_3$)$_2$—; —C($CF_3$)$_2$—; —C(=$CCl_2$)—; —C($CH_3$)($CH_2CH_2COOH$)—; —N=N—; —$R^aC$=$CR^b$—, where each $R^a$ and $R^b$, independently of one another, is a hydrogen or a $C_1$-$C_{12}$-alkyl, $C_1$-$C_{12}$-alkoxy, or $C_6$-$C_{18}$-aryl group; —($CH_2$)$_n$— and —($CF_2$)$_n$— with n=integer from 1 to 6; an aliphatic divalent group, linear or branched, of up to 6 carbon atoms; and combinations thereof.

In some embodiments, the recurring units ($R_{PS}$) can be selected from the group consisting of those of formulae (C) to (E) herein below:

(C)

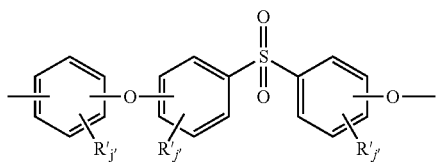

(D)

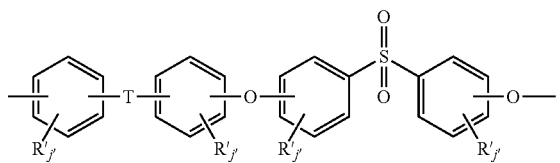

(E)

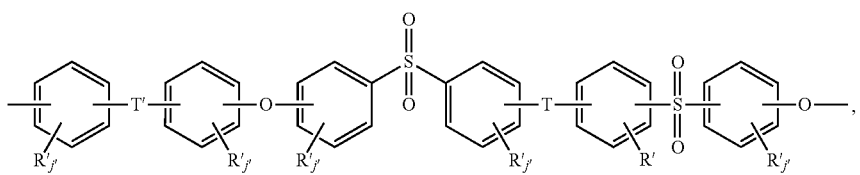

where
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4; and
T and T', equal to or different from each other, is selected from the group consisting of a bond, —$CH_2$—; —O—; —$SO_2$—; —S—; —C(O)—; —C($CH_3$)$_2$—, thioether, —C($CF_3$)$_2$; —C(=$CCl_2$)—; —C($CH_3$)($CH_2CH_2COOH$)—; —N=N—; —$R^aC$=$CR^b$—, where each $R^a$ and $R^b$, independently of one another, is a hydrogen or a $C_1$-$C_{12}$-alkyl, $C_1$-$C_{12}$-alkoxy, or $C_6$-$C_{18}$-aryl group; —($CH_2$)— and —($CF_2$)$_n$— with n being an integer from 1 to 6; an aliphatic divalent group, linear or branched, of up to 6 carbon atoms; and combinations thereof.

In some embodiments, the PAES polymer can be a poly(biphenyl ether sulonsiste), including but not limited to, a polyphenylsulfone, while in other embodiments, the PAES polymer can be a polyethersulfone, a polyetherethersulfone or a bisphenol A polysulfone. As used herein, a poly(biphenyl ether sulfone) refers to any polymer in which at least 50 wt. % of the recurring units are recurring units ($R_p$sa) of one or more formulae containing at least one ether group (—O—), at least one sulfone group [—S(=O)$_2$-] and at least two groups (G*), each group (G*) independently selected form the group consisting of phenylenes, naphthylenes (e.g., 2,6-naphthylene), anthrylenes (e.g., 2,6-anthrylene) and phenanthrylenes (e.g., 2,7-phenanthrylene), naphthacenylenes and pyrenylenes; where each of the groups (G*) are joined to at least one group (G*) different from itself, directly by at least one single bond and, optionally in addition, by at most one methylene group. Accordingly, groups (G*) can be joined together to form groups including, but not limited to, biphenylene groups (e.g., p-biphenylene), 1,2'-binaphthylene groups, terphenylene groups (e.g., p-terphenylene) and fluorenylene groups (divalent groups derived from fluorene). In some embodiments, at least about 75 wt. %, at least about 85 wt. %, at least about 95 wt. %, or at least about 99 wt. % of the recurring units of the poly(biphenyl ether sulfone) are recurring units ($R_{PSa}$) as defined above.

In some embodiments, the recurring units ($R_{PSa}$) can be recurring units of formula (A), as defined above, with the proviso that at least one $Ar^1$ through $Ar^5$ is an aromatic moiety desirably represented by a formula selected from the following group of formulae consisting of:

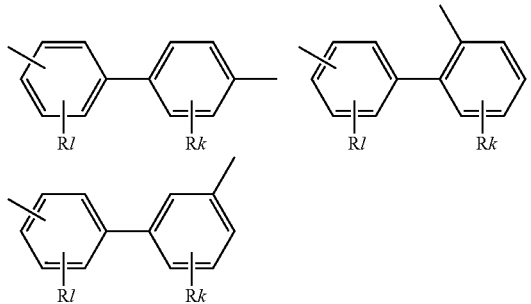

where R is independently selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and k and l equal or different from each other, are independently 0, 1, 2, 3 or 4. In such aforementioned embodiments, T, T', $Ar^1$, $Ar^2$, $Ar^3$, $Ar^4$, $Ar^5$, n and m can be as described above.

In some embodiments, recurring units ($R_{PSa}$) can be represented by the group of formulae consisting of formulae (F) to (H) below:

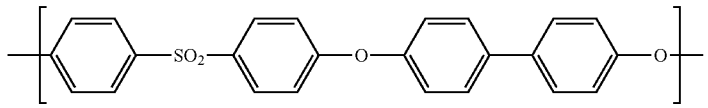

(F)

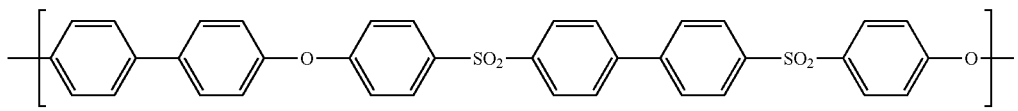

(G)

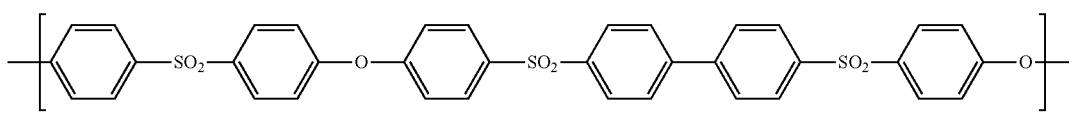

(H)

and mixtures thereof.

In some embodiments, the PAES polymer can be a polyphenylsulfone ("PPSU") polymer. As used herein, PPSU refers to any polymer in which more than 50 wt. % of the recurring units are recurring units ($R_{PSa}$) of formula (F).

In some embodiments, more than about 75 wt. %, more than about 85 wt. %, more than about 95 wt. %, or more than about 99 wt. % of the recurring units of the PPSU are recurring units ($R_{PSa}$) of formula (F). PPSU can be prepared by methods known to a person of ordinary skill in the art. PPSU is additionally commercially available as RADEL® PPSU and DURADEX® D-3000 PPSU (both from Solvay Specialty Polymers USA, L.L.C.).

In some embodiments, the PAES can be a polyetherethersulfone ("PEES") polymer or a bisphenol A polysulfone polymer. As used herein, a PEES refers to any polymer in which at least 50 wt. % of the recurring units are recurring units ($R_{PSc}$) of formula (I-2):

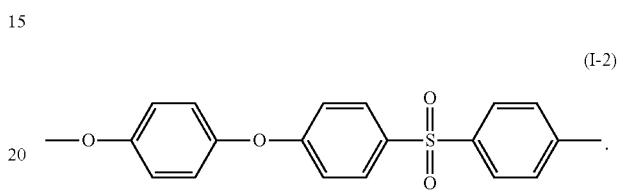

(I-2)

In some embodiments, at least about 75 wt. %, at least about 85 wt. %, at least about 95 wt. % or at least about 99 wt. % of the recurring units ($R_{PSc}$) of the PEES are recurring units of formula (I-2). In some embodiments, the PEES consists essentially of recurring units ($R_{PSc}$) of formula (I-2).

In some embodiments, the PAES is a bisphenol A polysulfone ("PSU") polymer. As used herein, PSU refers to any polymer in which at least 50 wt. % of the recurring units are recurring units ($R_{PSd}$) of formula (I-3):

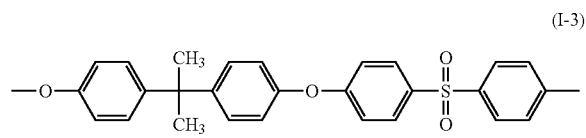

(I-3)

In some embodiments, at least about 75 wt. %, at least about 85 wt. %, at least about 95 wt. % or at least about 99 wt. % of the recurring units of the PSU are recurring units ($R_{PSd}$) of formula (I-3). In some embodiments, the PSU consists essentially of units ($R_{PSd}$) of formula (I-3). PSU can be prepared by methods known to the person of ordinary skill in the art. Additionally, PSU is commercially available as UDEL® PSU from Solvay Specialty Polymers USA, L.L.C.

In some embodiments, the PAES polymer can be a poly(aryl sulfone ketone) ("PASK") polymer. As used herein, PASK refers to a PAES of formula (D), above, where T is —C(=O)—, wherein the PASK polymer has at least 50 wt. % recurring units ($R_{PASK}$) represented by the formula (I-4):

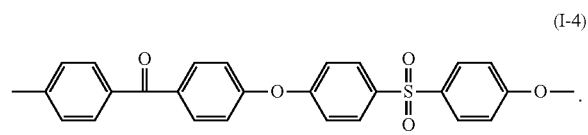

(I-4)

In some embodiments, at least about 75 wt. %, at least about 85 wt. %, at least about 95 wt. % or at least about 99 wt. % of the recurring units of the PASK polymer are recurring units ($R_{PASK}$) of formula (I-4). In some embodiments, the PASK polymer consists essentially of repeat units ($R_{PASK}$) of formula (I-4). PASK polymers can be synthesized as described in detail below in the Examples. While the poly(aryl ether sulfone) polymers have been described above with respect to particular repeat units, in some embodiments, the poly(aryl ether sulfone) polymers can be copolymers of one or more distinct repeat units described above. The copolymers can be block copolymers, random copolymers or alternate copolymers.

Poly(Aryl Ether Ketone)s

In some embodiments, one or more of the poly(aryl ether) polymers can be a PAEK1 polymer. As used herein, PAEK1 refers to any polymer, including at least 50 wt. % of recurring units ($R_{PAEK}$) having a Ar—C(=O)—Ar' group, with Ar and Ar', equal to or different from each other, being aromatic groups. In some embodiments the PAEK1, has at least about 60 wt. %, at least about 80 wt. %, at least about 90 wt. %, at least about 95 wt. % or at least about 98 wt. % recurring units ($R_{PAEK}$). The recurring units ($R_{PAEK}$) can be represented by a formula selected from the group consisting of formulae (J-A) to (J-Q), herein below:

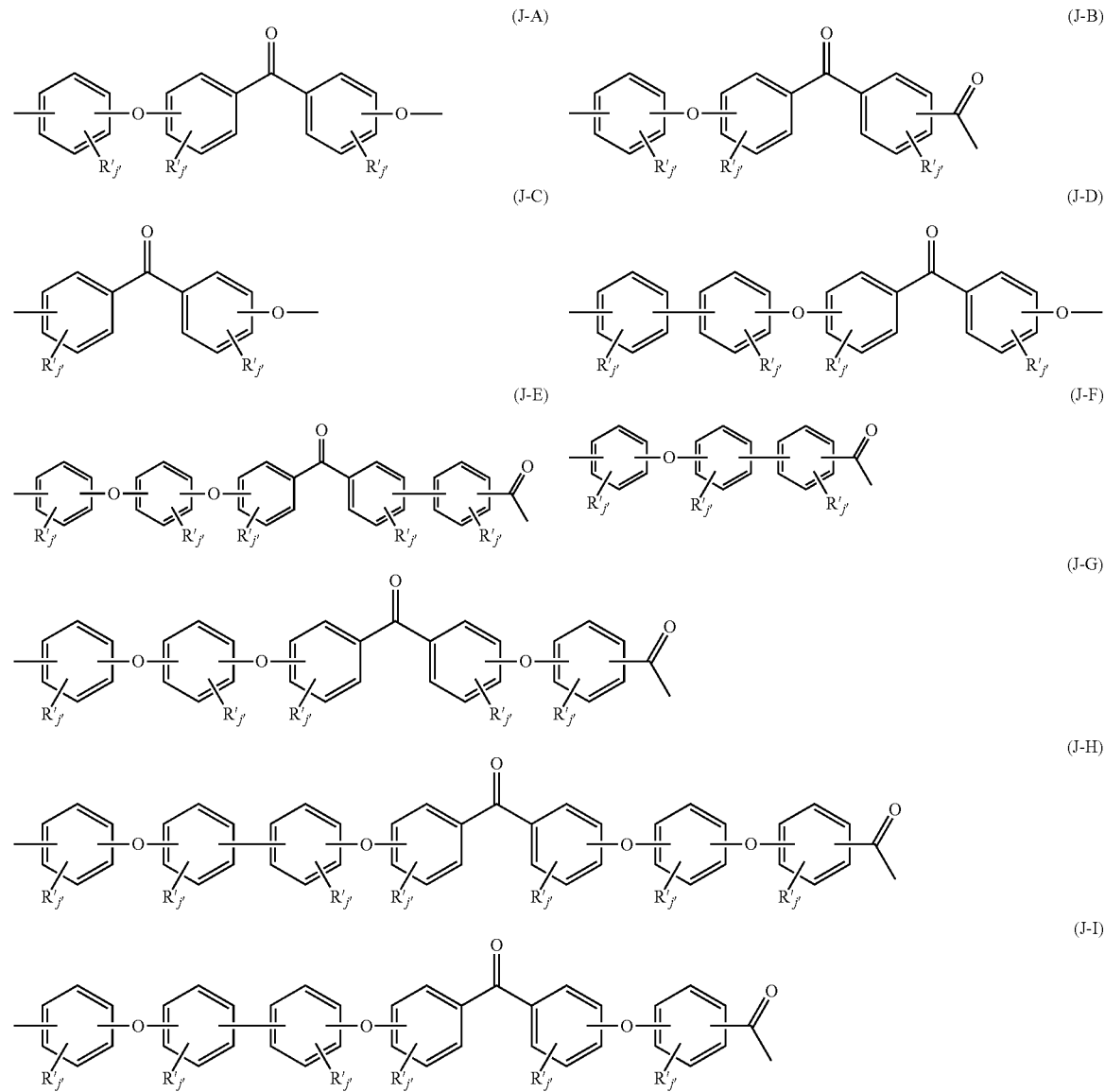

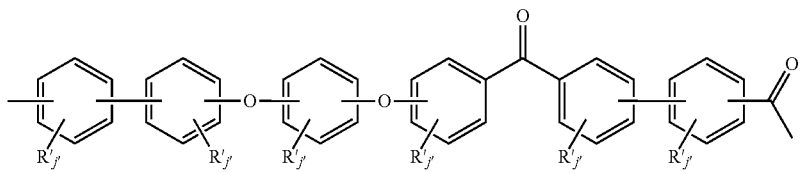
(J-J)

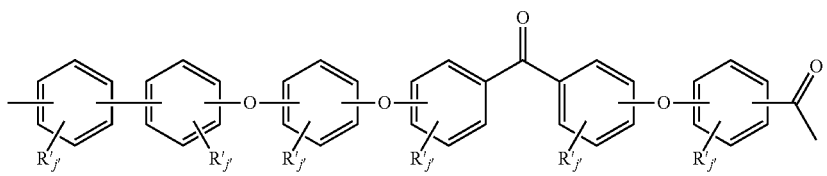
(J-K)

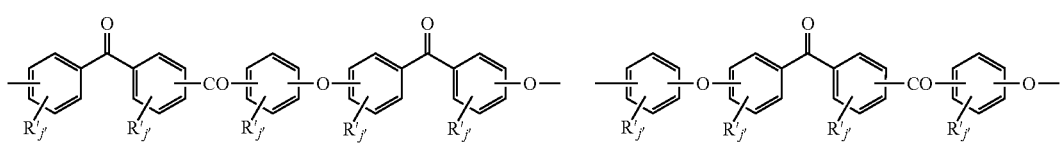
(J-L) (J-M)

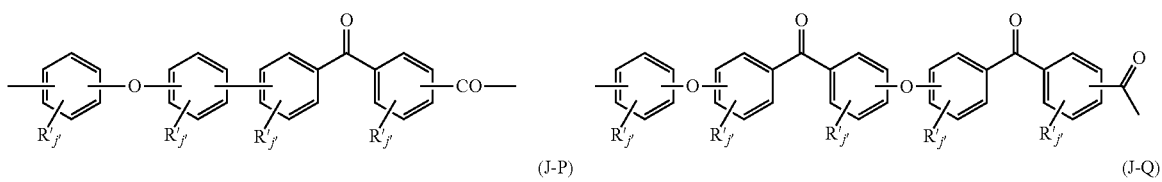
(J-N) (J-O)

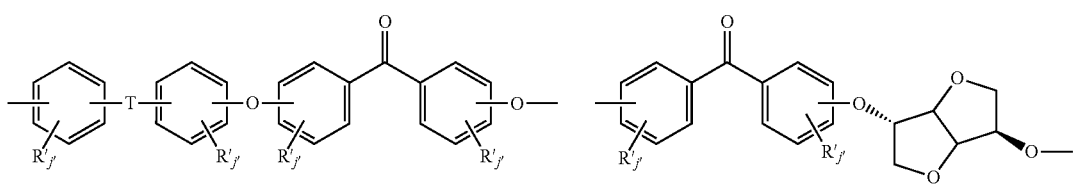
(J-P) (J-Q)

where
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
- j' is zero or is an integer from 0 to 4.
- T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—, where each R$^a$ and R$^b$, independently of one another, is a hydrogen or a C$_1$-C$_{12}$-alkyl, C$_1$-C$_{12}$-alkoxy, or C$_6$-C$_{18}$-aryl group; —(CH$_2$)$_n$— and —(CF$_2$)$_n$— with n being an integer from 1 to 6; an aliphatic divalent group, linear or branched, of up to 6 carbon atoms; and combinations thereof.

In some embodiments, the respective phenylene moieties of recurring unit (R$_{PAEK}$) can independently have 1,2-, 1,4- or 1,3-linkages to the other moieties different from R' in the recurring unit. In some embodiments, the phenylene moieties have 1,3- or 1,4-linkages. In further embodiments, the phenyl moieties have 1,4-linkages.

Furthermore, in some embodiments, j' in recurring units (R$_{PAEK}$) can be at each occurrence zero; that is to say that the phenylene moieties have no other substituents than those enabling linkage in the main chain of the polymer. In some such embodiments, recurring units (R$_{PAEK}$) can be represented by a formula selected from the group of formulae (J'-A) to (J'-Q) below:

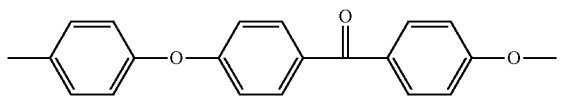
(J'-A)

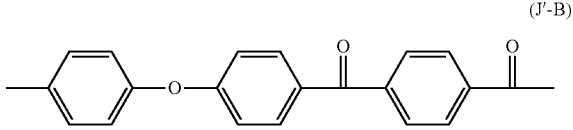
(J'-B)

-continued
(J′-C)
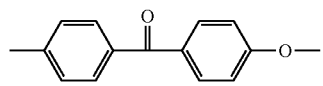
(J′-D)
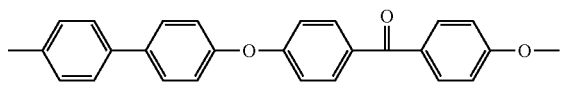
(J′-E)
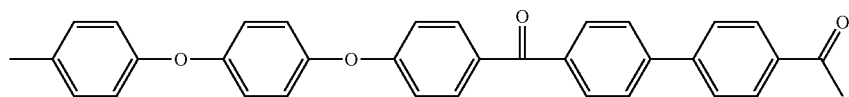
(J′-F)
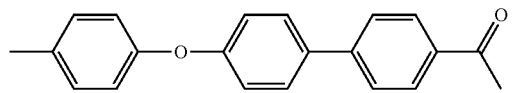
(J′-G)
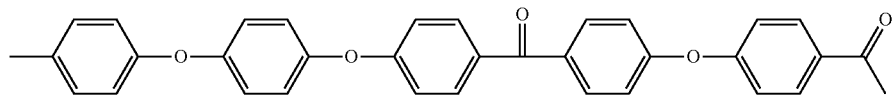
(J′-H)
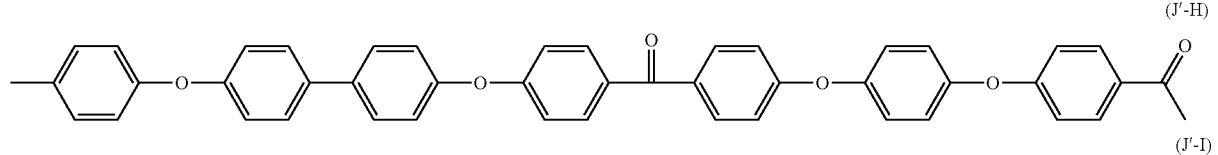
(J′-I)
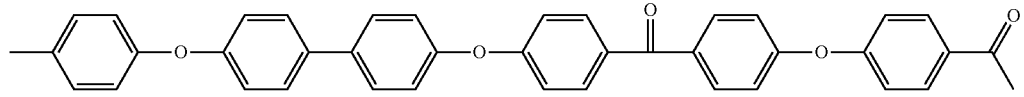
(J′-J)
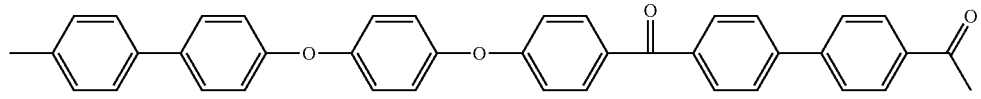
(J′-K)
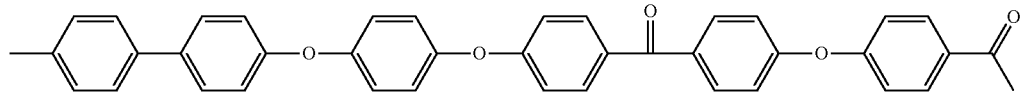
(J′-L)
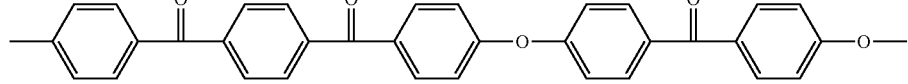
(J′-M)
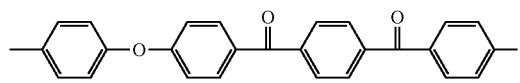
(J′-N)
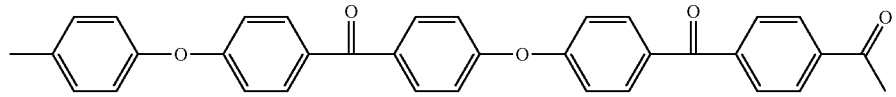
(J′-O)
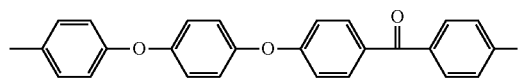
(J′-P1)
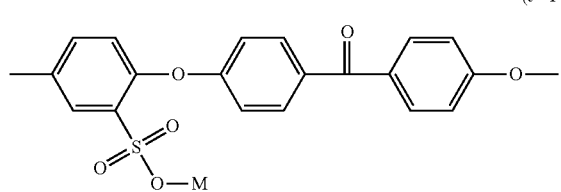
(J′-P2)
(J′-P3)
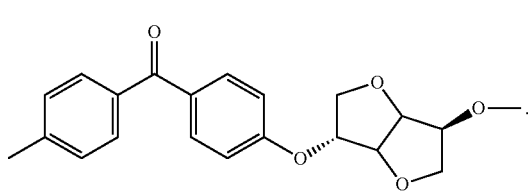
(J′-Q)

In some embodiments, the recurring units ($R_{PAEK}$) can be represented by a formula selected from the group consisting of the following formulae

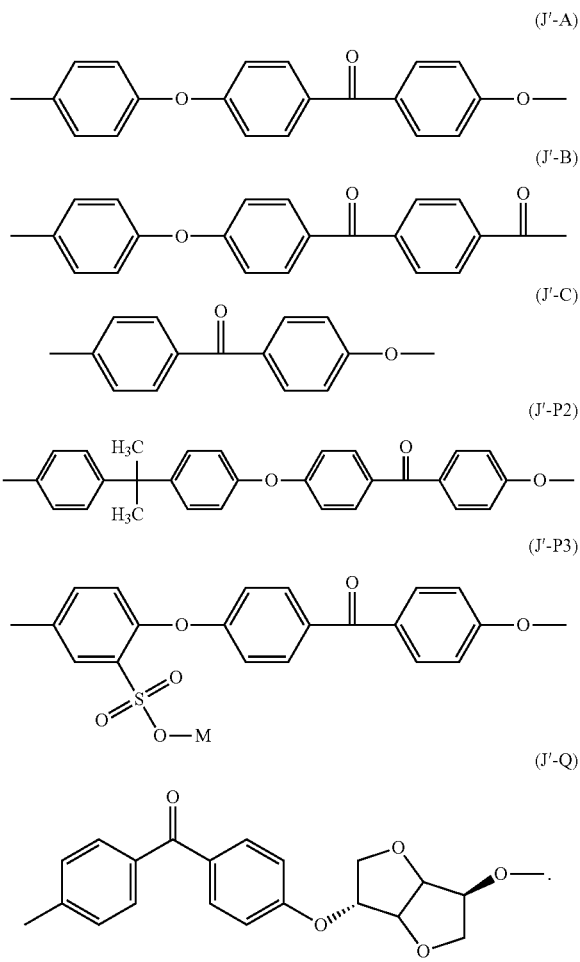

The PAEK1 polymer may be a homopolymer, a random, alternate or block copolymer. When the PAEK1 polymer is a copolymer, it may contain (i) recurring units ($R_{PAEK}$) of at least two different formulae chosen from formulae (J-A) to (J-Q), or (ii) recurring units ($R_{PAEK}$) of one or more formulae (J-A) to (J-Q) and recurring units ($R^*_{PAEK}$) different from recurring units ($R_{PAEK}$).

As will be detailed later on, the PAEK1 polymer may be a polyetheretherketone ("PEEK") polymer. Alternatively, the PAEK1 polymer may be a polyetherketoneketone ("PEEK") polymer, a polyetherketone ("PEK") polymer or a PEEK-PEK polymer. As used herein, the term "PEEK polymer" refers to any polymer in which at least 50 wt. % of the recurring units are recurring units ($R_{PAEK}$) of formula J'-A. In some embodiments, at least about 75 wt. %, at least about 85 wt. %, at least about 95 wt. %, or at least about 99 wt. % of the recurring units of the PEEK polymer are recurring units of formula J'-A. In some embodiments, 99.99 wt. % of the PEEK polymer are recurring units of formula J'-A. Additionally, as used herein, the term "PEKK polymer" refers to any polymer in which at least 50 wt. % of the recurring units are recurring units ($R_{PAEK}$) of formula J'-B. In some embodiments, at least about 75 wt. %, at least about 85 wt. %, at least about 95 wt. % or at least about 99 wt. % of the recurring units of the PEKK polymer are recurring units of formula J'-B. In some embodiments, at least about 99.99 wt. % of the recurring units of the PEKK polymer are recurring units of formula J'-B. Moreover, as used herein, the term "PEK polymer" is intended to denote any polymer in which at least 50 wt. % of the recurring units are recurring units ($R_{PAEK}$) of formula J'-C. In some embodiments, at least about 75 wt. %, at least about 85 wt. %, at least about 95 wt. % or at least about 99 wt. % of the recurring units of the PEK polymer are recurring units of formula J'-C. In some embodiments, at least 99.99 wt. % of the recurring units of the PEK polymer are recurring units of formula J'-C. The PAEK1 polymers can be prepared by any method known in the art for the manufacture of poly(aryl ether ketone)s. Furthermore, PEEK is commercially available as KETASPIRE® polyetheretherketone from Solvay Specialty Polymers USA, LLC.

In some embodiments, the PAEK1 polymer can be a poly(isosorbide ketone) ("PIK") polymer. As used herein, the term "PIK polymer" refers to any polymer in which at least 50 wt. % of the recurring units are recurring units ($R_{PAEK}$) of formula J'-Q. In some embodiments, at least about 75 wt. %, at least about 85 wt. %, at least about 95 wt. % or at least about 99 wt. % of the recurring units of the PIK polymer are recurring units of formula J'-Q. In some embodiments, at least 99.99 wt. % of the recurring units of the PIK polymer are recurring units of formula J'-Q. PIK polymers can by synthesized as described in U.S. patent application publication number 2014/0186624 to Sriram et al and filed Feb. 11, 2014, the entirety of which is incorporated herein by reference.

Additives

In some embodiments, the adhesive compositions or the overmold compositions can optionally include one or more additives including, but not limited to, a colorant (e.g., a dye and/or a pigment), ultraviolet light stabilizers, heat stabilizers, antioxidants, reinforcing fillers, an acid scavenger, processing aids, nucleating agents, an internal lubricant and/or an external lubricant, flame retardants, a smoke-suppressing agent, an anti-static agent, an anti-blocking agent, a conductivity additive (e.g., carbon black and carbon nanofibrils) or any combination thereof.

A person of ordinary skill in the art will know how to select an appropriate reinforcing filler according to the particular adhesive composition or overmold composition, the intended processing approach and the intended application setting of the polymer-metal junction. For example, the reinforcing filler can be selected with reference to its chemical nature, its length, diameter, ability to desirably feed into compounding equipment without bridging and surface treatment (e.g., good interfacial adhesion between the reinforcing filler and the poly(aryl ether) promotes the strength and the toughness of the blend).

In some embodiments, the reinforcing fillers can be fibrous reinforcing fillers, particulate reinforcing fillers or a combination thereof. As used herein, a fibrous reinforcing filler is a material having length, width and thickness, where the average length is significantly larger than both the width and thickness. Generally, such a material has an aspect ratio of at least about 5, where the aspect ratio is defined as the average ratio between the length and the largest of the width and thickness. In some embodiments, the fibrous reinforcing filler can have an aspect ratio that is at least about 10, at least about 20 or at least about 50.

In some embodiments, the reinforcing fibrous filler can include, but are not limited to, glass fibers; carbon fibers such as notably graphitic carbon fibers (in some embodiments, having a graphite content of at least about 99 wt. %), amorphous carbon fibers, pitch-based carbon fibers (in some embodiments, having a graphite content of at least about 99 wt. %), PAN-based carbon fibers; synthetic polymeric fiber; aramid fiber; aluminum fiber; aluminum silicate fibers; oxide of metals of such aluminum fibers; titanium fiber; magnesium fiber; boron carbide fibers; rock wool fiber; steel fiber; asbestos; wollastonite; silicon carbide fibers; boron fibers, graphene, carbon nanotubes (CNT) or any combination thereof. In some embodiments, the reinforcing fibrous filler can desirably include glass fibers.

In some embodiments, the reinforcing fillers can be non-fibrous, including, but not limited to, talc, mica, titanium dioxide, kaolin, calcium carbonate, calcium silicate, magnesium carbonate, zinc sulfide or any combination thereof.

When one or more reinforcing fillers are present, the overmold or the adhesive compositions can include at least about 5 wt. %, at least about 10 wt. %, at least about 15 wt. % or at least about 20 wt. % one or more reinforcing fillers, relative the total weight of the adhesive composition. In some embodiments, the adhesive composition can include no more than about 50 wt. %, no more than about 45 wt. %, no more than about 40 wt. % or no more than about 30 wt. % one or more reinforcing fillers, relative to the total weight of the adhesive composition. When one or more other additives are present, the adhesive composition can include no more than about 50 wt. %, no more than about 20 wt. %, no more than about 10 wt. % or no more than about 5 wt. % one or more other additives, relative to the total weight of the adhesive composition.

Should the disclosure of any patents, patent applications, and publications which are incorporated herein by reference conflict with the description of the present application to the extent that it may render a term unclear, the present description shall take precedence.

EXAMPLES

The following Examples demonstrate the synthesis of poly(aryl ether)s and the adhesion of PAEK2 overmold compositions to metals using poly(aryl ether) adhesive compositions. To demonstrate adhesion, lap shear samples were formed and the lap shear stress was measured at room temperature and according to the ASTM D1002 standard with a grip distance of 3.5 inches. Lap shear samples were formed by coating a metal substrate with an adhesive composition, an overmold composition, or both. The metal substrates were formed from aluminum 6061 alloy or stainless steel and had a double butt lap joint with a surface area of about 0.25 square inches ("In"). Unless otherwise indicated below, the substrates were laser etched (Minilase™, from Tykma Technologies) to form a crosshatch pattern having a distance of about 100 µm between parallel lines. Following etching, the metal substrates were rinsed in acetone or isopropanol and dried in a vacuum oven at about 50 Torr to about 100 Torr and at about 50° C. or 100° C.

For lap shear samples including an adhesive composition, the substrates were dip coated in a solution consisting of 20 wt. % of the adhesive composition and N-methylpyrrolidinone ("NMP") to form an adhesive layer. In particular, the substrates were immersed in the solution for about 1 minute and then dried, under air at atmospheric pressure, at about 150° C. for about 50 minutes and, subsequently, at about 250° C. for about 20 minutes. After drying, the thickness of the film was measured using a caliper and dip coating and drying was repeated until an adhesive layer having an thickness of about 200 µm to about 500 m was formed (the desired film thickness was generally achieved after 2 or 3 repetitions).

A PEEK was deposited on the metal substrates (on the coated metal substrates for lap shear samples having an adhesive composition or on the uncoated metal substrates for lap shear samples not having an adhesive composition) using injection molding. In particular, the metal substrates were preheated to a temperature of about 190° C. to about 200° C. in an oven and, subsequently, on a hotplate. The preheated substrates were then placed in an injection mold heated to about 199° C. The PEEK composition was then injected, into the mold, at a temperature between from about 370° C. to about 380° C. to form the lap shear samples. The lap shear sample was removed from the mold and allowed to continue to cool to room temperature.

The adhesive compositions used in the Examples are displayed in TABLE 1 and TABLE 1A. In TABLE 1 and the following tables, "SSP" indicates that the source of a composition is Solvay Specialty Polymers USA, LLP. Furthermore, in TABLE 1 and the following tables, "AC" refers to adhesive composition, "Ex" refers to Example, "PSU" refers to polysulfone, "PESU" refers to polyethersulfone, "PPSU" refers to polyphenylsulfone and "PIK" refers to poly(isosorbide ketone). The PIK was synthesized as described in Example 1 of U.S. patent application publication number 2014/0186624 to Sriram et al and filed Feb. 11, 2014, the entirety of which is incorporated herein by reference.

TABLE 1

| AC | PAEK1 Polymer Repeat Unit | Poly(Aryl Ether) | Source | Tg (° C.) |
|---|---|---|---|---|
| 1 | 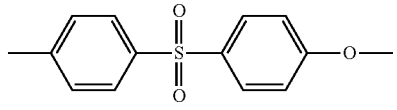 | PESU | Virantage ® VW-10700RFP (SSP) | 220 |
| 2 | 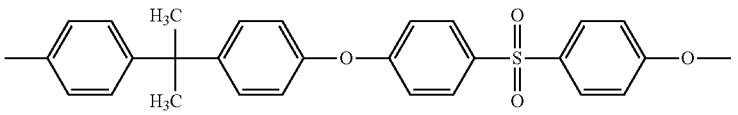 | PSU | Udel ® PSU P-1700NT (SSP) | 192 |

TABLE 1-continued

| AC | PAEK1 Polymer Repeat Unit | Poly(Aryl Ether) | Source | Tg (° C.) |
|---|---|---|---|---|
| 3 | (structure) | PPSU | Radel ® PPSU R-5100 (SSP) | 220 |
| 4 | (structure) | Poly (Ether Sulfone Ketone) | Ex. 1 | 192 |
| 5 | (structure) | Poly (Ether Bishpenol A Ketone) | Ex. 2 | 157 |
| 6 | —[A]—[B]— A = (structure with SO$_3$—Na) B = (structure) | Sulfonated PEEK (Na+ form) | Ex. 3 | 187 |
| 7 | —[A]—[B]— A = (structure with SO$_3$H) B = (structure) | sulfonated PEEK (H+ form) | Ex. 3 | Decomposes |
| 8 | (structure) | PESU | Veradel ® PESU 3600 (SSP) | 220 |
| 9 | (structure) | PSU | Udel ® PSU P-3703 (SSP) | 192 |
| 10 | (structure) | PIK | Synthesized as Described in U.S. 2014/0186624 | 168 |

TABLE 1A

| AC | PAEK1 Polymer Repeat Unit | Poly(Aryl Ether) | Source | Tg (° C.) |
| --- | --- | --- | --- | --- |
| 11 | [PEKK repeat unit structure: 60/40 copolymer] | PEKK | Cytec PEKK DS-E | 156 |
| 12 | [PEEK repeat unit structure] | PEEK | KT-820 FP (SSP) | 149 |
| 13 | [PEEK-PEDEK 70/30 repeat unit structure] | PEEK-PEDEK 70/30 | Ex. 7 | 153 |
| 14 | [PEEK-PEDEK 75/25 repeat unit structure] | PEEK-PEDEK 75/25 | Ex. 8 | 154 |
| 15 | [PEEK-PEDEK 80/20 repeat unit structure] | PEEK-PEDEK 80/20 | Ex. 9 | 152 |

The overmold compositions (including PAEK2) used in the Examples are displayed in TABLE 2. The source of the glass fiber in each composition was from the Ketaspire® PEEK KT 880 GF 30 composition.

TABLE 2

| Overmold Composition | Source | P0 (wt. %) | P1 (wt. %) | P2 (wt. %) | P3 (wt. %) | P4 (wt. %) | P5 (wt. %) |
| --- | --- | --- | --- | --- | --- | --- | --- |
| PEEK | Ketaspire® PEEK KT-880 GF 30 (SSP) | 70 | 42.0 | 37.96 | 52.5 | 45.5 | 42 |
| PSU | Udel® PSU P-1700NT (SSP) | | 27.9 | | | | |
| PESU | Veradel® PESU 3600 (SSP) | | | 26.94 | 14.4 | 20.2 | 14 |
| PPSU | Radel® PPSU R-5900 (SSP) | | | 5.0 | | | |
| PPSU | Radel® PPSU R-5100 (SSP) | | | | 3.1 | 4.3 | |
| PPSU | Radel® R-PPSU 5600 (SSP) | | | | | | 14 |
| Glass Fiber | | 30.0 | 30.0 | 30.0 | 30.0 | 30.0 | 30.0 |

The results of the lap shear test measurements are reported with respect to lap shear stress at break as well and were further analyzed to determine the type of failure at break. In particular, following failure of the lap shear samples, the samples were analyzed to determine if the failure was "Adhesive", "Cohesive", "Partially Cohesive" or "Specimen Break." Adhesive failures were characterized by a lack of visually detectable polymer on the metal and lack of visually detectable metal on the polymer, on the fracture surface of the sample. Cohesive failures were characterized by a visually detectable amount of polymer on the metal or a visually detectable amount of metal on the polymer, on the fracture surface of the sample. Partially Cohesive failures were analogous to Cohesive failures but showed a reduced amount of polymer on the metal or metal on the polymer. "Specimen Break" was characterized by fracture in the bulk polymer and not at the metal/polymer interface.

Example 1—Synthesis of Poly(Ether Sulfone Ketone)

In a 1 L 4-neck reaction flask fitted with a stirrer, a N2 inlet tube, a Claisen adapter with a thermocouple plunging in the reaction medium, and a Dean-Stark trap with a condenser and a dry ice trap were introduced 339.26 g of diphenyl sulfone, 99.61 g of 4,4'-dihydroxybenzophenone (0.465 mol), 46.57 g of dry sodium carbonate (0.439 mol) and 6.426 g of dry potassium carbonate (0.046 mol). The flask content was evacuated under vacuum and then filled with high purity nitrogen (containing less than 10 ppm $O_2$). The operation was repeated twice. The reaction mixture was then placed under a constant nitrogen purge (60 mL/min).

The reaction mixture was heated slowly to 160° C. At 160° C., a mixture of 59.11 g of 4,4'-difluorodiphenylsulfone (0.232 mol) and 67.43 g of 4,4'-dichlorodiphenylsulfone (0.235 mol) were added via a powder dispenser to the reaction mixture over 30 minutes. At the end of the addition, the reaction mixture was heated to 310° C. at 1° C./minute. After 8 minutes at 310° C., 2.365 g of 4,4'-difluorodiphenylsulfone were added to the reaction mixture while keeping a nitrogen purge on the reactor. After 2 minutes, 19.71 g of lithium chloride were added to the reaction mixture. 2 minutes later, another 1.182 g of 4,4'-difluorodiphenylsulfone were added to the reactor and the reaction mixture was kept at temperature for 2 minutes. The reactor content was then poured from the reactor into a stainless steel pan and cooled. The solid was broken up and ground in an attrition mill through a 2 mm screen. Diphenyl sulfone and salts were extracted from the mixture with a mixture acetone/methanol (50/50) and water at pH between 1 and 12. The last wash water had a pH between 6 and 7. The powder was then and dried at 120° C. under vacuum for 12 hours yielding 183.3 g of a yellow powder. Analysis by size exclusion chromatograph ("SEC") showed the polymer had Mn=26196, Mw=83073. By differential scanning calorimetry ("DSC"), the polymer was shown to be amorphous with a Tg (half height) of 192° C.

SEC was performed using methylene chloride as a mobile phase. Two, 5 micron ("μm") mixed D SEC columns with guard columns (Agilent Technologies) was used for separation. An ultraviolet detector of 254 nm was used to obtain the chromatograms. A flow rate of 1.5 mL/min and injection volume of 20 micro liters ("L") of a 0.2% weight by volume ("w/v") solution in mobile phase was selected. Calibration was performed using narrow calibration standards of Polystyrene (Agilent Technologies) (Calibration Curve: 1) Type: Relative, Narrow calibration standard calibration 2) Fit: $3^{rd}$ order regression). Empower Pro GPC software (Waters) was used to acquire data, calibrate and determine molecular weight.

Example 2—Synthesis of Poly(Ether Bisphenol a Ketone)

In a 1 L 4-neck reaction flask fitted with a stirrer, a $N_2$ inlet tube, a Claisen adapter with a thermocouple plunging in the reaction medium, and a Dean-Stark trap with a condenser and a dry ice trap were introduced 169.70 g of N,N-dimethylacetamide, 254.5 g of toluene, 111.93 g of bisphenol A (0.490 mol), 84.70 g of dry potassium carbonate (0.613 mol). The flask content was evacuated under vacuum and then filled with high purity nitrogen (containing less than 10 ppm 02). The operation was repeated twice. The reaction mixture was then placed under a constant nitrogen purge (60 mL/min).

The reaction mixture was heated slowly to 130° C. An azeotrope toluene/water was collected and the water separated. The reaction mixture was held for 4 hours at 130° C. while removing water through the azeotrope. At 130° C., a solution of 107.63 g of 4,4'-difluorodibenzophenone (0.493 mol) in 169.70 g of N,N-dimethylacetamide was added via an addition funnel to the reaction mixture over 30 minutes. At the end of the addition, the reaction mixture was heated to 165° C. After 40 minutes at 165° C., 4.279 g of 4,4'-difluorodibenzophenone were added to the reaction mixture while keeping a nitrogen purge on the reactor. After 15 minutes, 20.78 g of lithium chloride were added to the reaction mixture. 10 minutes later, another 3.2095 g of 4,4'-difluorodibenzophenone were added to the reactor and the reaction mixture was kept at temperature for 30 minutes. The reactor content was then coagulated in 2.0 L methanol. The solid was filtered off and washed with a mixture acetone/methanol (50/50) then with water at pH between 1 and 12. The last wash water had a pH between 6 and 7. The powder was then dried at 120° C. under vacuum for 12 hours yielding 171.3 g of a white powder. Analysis by SEC showed the polymer had Mn=34046, Mw=123149. By DSC, the polymer was shown to be amorphous with a Tg (half height) of 157° C.

Example 3—Synthesis of Sulfonated PEEK

This Example demonstrates the synthesis of the $H^+$ and $Na^+$ forms for sulfonated PEEK.

To demonstrate the synthesis of the $H^+$ form of sulfonated PEEK, in a 3 L 4-neck reaction flask fitted with a stirrer, a $N_2$ inlet tube, a Claisen adapter with a thermocouple plunging in the reaction medium, and a Dean-Stark trap with a condenser and a dry ice trap were introduced 2.0 L of concentrated H2SO4 (96%) and 60.00 g of KT820FP powder (commercially available form Solvay Specialty Polymers USA, LLC). At the end of the addition, the reaction mixture was heated to 50° C. under agitation and under a nitrogen atmosphere. The mixture was held at 50° C. for 5 h then coagulated under high shear (Waring blender) in 4 L demineralized water. The solid was filtered off and washed with water and methanol until pH higher than 4. The solid was then dried at 70° C. under vacuum for 12 hours yielding 153.7 g of a soft hygroscopic dark solid. The analysis by FTIR was shown to be identical with sulfonated PEEK, as described in Xigao et al., *Brit. Polymer Journal,* 1985, V17, P 4-10, which is incorporated herein by reference. The synthesized copolymer was represented by the following formula:

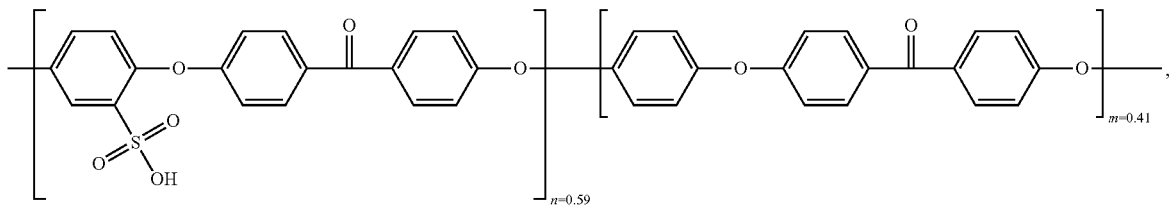

where n and m are the mole fractions of the corresponding repeat units.

To demonstrate the synthesis of the $Na^+$ form of sulfonated PEEK, a sample (62.1 g) of the $H^+$ form of sulfonated PEEK, described above, was slurried with 2 L demineralized water containing 6.09 g sodium chloride. The slurry was allowed to mix for 2 h. The solid was then filtered off and washed with additional demineralized ("DM") water (4 times). The solid was then dried at 70° C. under vacuum for 12 hours yielding 59.0 g of a soft hygroscopic dark solid. By DSC, the polymer was shown to be amorphous with a Tg (half height) of 187° C. Elemental analysis for sulfur showed that the polymer was 59% sulfonated. The synthesized copolymer was represented by the following formula:

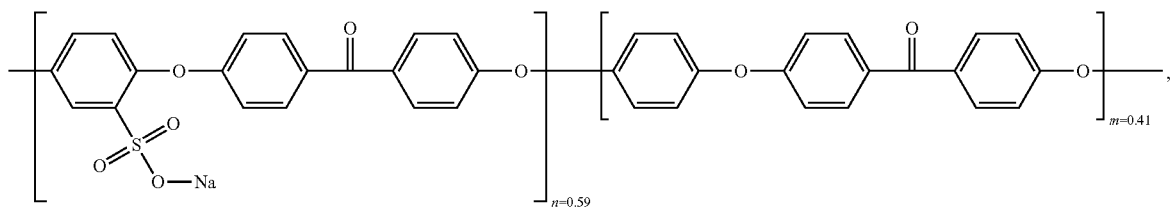

where n and m are the mole fractions of the corresponding repeat units.

Example 4—Adhesion of Overmold Compositions to Aluminum

This Example demonstrates the adhesion of PAEK2 overmold compositions to aluminum 6061 substrates using poly(aryl ether) adhesive compositions.

To demonstrate adhesion, 7 sample sets were formed. In particular, each sample set included a set of 5 (Sample Sets 1-4, 7 and 8) or 6 (Sample Sets 5 and 6) replicate lap shear samples as described above, and was formed with aluminum 6061 substrates. After laser etching, the substrates were rinsed in acetone and dried in a vacuum oven at 50° C. For each lap shear sample, the overmold composition was P0. Sample Set 1 was formed without an adhesive composition. For Sample Sets 2-8, the adhesive compositions were AC 1-7, respectively.

Following formation, the lap shear stress of the lap shear samples in each Sample Set was determined as described above. Sample Set parameters and results of the lap shear stress measurements are displayed in TABLE 2, below. In Table 2, "Td 5% Loss" refers to the average temperature at which the corresponding adhesive composition lost 5% of its weight as determined by thermogravimetric analysis ("TGA") according to the ASTM D3850 standard. TGA was performed on a TA Instruments TGA Q500 from 30° C. to 800° C. under nitrogen (60 mL/min) at 10° C./minute. Furthermore, the lap shear stress values listed in TABLE 3 are averaged over the number of lap shear samples in the corresponding Sample Set.

TABLE 3

| Sample Set/ Adhesive Composition | % SO2 in Adhesive Composition | Td 5% loss (° C.) | Lapshear Stress (psi) | Std. dev. (psi) | No. Cohesive Failures | Failure Type |
|---|---|---|---|---|---|---|
| 1/None | None | N/A | 670 | 16.5 | 3/5 | Partially cohesive |
| 2/AC1 | 27.5 | 506 | 454 | 301 | 4/5 | Cohesive failure |
| 3/AC2 | 14.4 | 499 | 1520 | 122 | 5/5 | Specimen break |
| 4/AC3 | 16.0 | 537 | 1530 | 357 | 5/5 | Specimen break |
| 5/AC4 | 14.9 | 486 | 963 | 229 | 6/6 | Specimen break |
| 6/AC5 | 0.0 | 498 | 1650 | 179 | 6/6 | Specimen break |
| 7/AC6 | 10.8 | 452 | 808 | 213 | 5/5 | Specimen break |
| 8/AC7 | 11.2 | <100 | 62.4 | 18 | 0/5 | Adhesive failure |

Referring to TABLE 3, the results demonstrate that for the lap shear samples tested, adhesive compositions including amorphous poly(aryl ether ketone)s and poly(aryl ether sulfone)s significantly improve the adhesion of PAEK2 overmold compositions to aluminum. In particular, the results demonstrate that PAEK2 overmold composition adhesion to aluminum is significantly improved when the poly(aryl ether) adhesive composition had an $SO_2$ content below about 25 wt. % and when the poly(aryl ether) adhesive composition was thermally stable up to about 200° C., with respect to the Td at 5% weight loss. For example, Sample Sets 3-7 resulted in specimen break for 4 of 5 of the lap shear samples in the set, while the lap shear samples of Sample Set 2 (% $SO_2$>25) and Sample Set 8 (Td 5% loss <100) all resulted in cohesive failure and adhesive failure, respectively. Similarly, lap shear samples of Sample Sets 3-7 also had greater lap shear stress at failure, relative to samples of Sample Sets 1 and 8. It is suspected that for Sample Set 8, the adhesive composition degraded during the drying step of the dip coating process (up to 250° C.>>Td5%) for the preparation of the tie layer.

Example 5—Adhesion of Overmold Compositions to Stainless Steel

This Example demonstrates the adhesion of PAEK2 overmold compositions to 316 stainless steel substrates using poly(aryl ether) adhesive compositions.

To demonstrate adhesion, an additional 14 Sample Sets (Sample Sets 9-22) were fabricated as described above. In particular, each sample set included a set of 2 (Sample Set 11), 3 (Sample Sets 9, 14 and 17), 4 (Sample Sets 10, 12, 13, 15, 16, 18 and 19) or 5 (Sample Sets 20-22) replicate lap shear samples as described above, and was formed with stainless steel substrates. Sample Set 11 included only 2 replicate lap shear samples due to poor adhesion of the overmold composition to the metal substrate, as demonstrated in TABLE 4, below. The stainless steel substrates of Sample Sets 11-17 were not laser etched. For Sample Sets 9, 10 and 12-22, after etching, the metal substrates were rinsed in isopropanol and dried in a vacuum oven at about 100° C. The parameters of the Sample Sets are displayed in TABLE 4.

TABLE 4

| Sample Set | Laser Etched Substrate | Adhesive Composition | Overmold Composition | % SO2 in Adhesive Composition | % SO2 in PEEK Composition |
|---|---|---|---|---|---|
| 9 | Yes | None | P0 | N/A | 0 |
| 10 | Yes | None | P2 | N/A | 11.7 |
| 11 | No | None | P2 | N/A | 11.7 |
| 12 | Yes | AC9 | P1 | 14.4 | 5.7 |
| 13 | Yes | AC8 | P1 | 27.5 | 5.7 |
| 14 | Yes | AC10 | P1 | 0 | 5.7 |
| 15 | Yes | AC9 | P2 | 14.4 | 11.7 |
| 16 | Yes | AC8 | P2 | 27.5 | 11.7 |
| 17 | Yes | AC10 | P2 | 0 | 11.7 |
| 18 | No | AC9 | P1 | 14.4 | 5.7 |

TABLE 4-continued

| Sample Set | Laser Etched Substrate | Adhesive Composition | Overmold Composition | % SO2 in Adhesive Composition | % SO2 in PEEK Composition |
|---|---|---|---|---|---|
| 19 | No | AC9 | P2 | 14.4 | 11.7 |
| 20 | No | AC9 | P3 | 14.4 | 6.4 |
| 21 | No | AC9 | P4 | 14.4 | 8.9 |
| 22 | No | AC9 | P5 | 14.4 | 8.7 |

The results of the lap shear measurements are displayed in TABLE 5, below.

TABLE 5

| Sample Set | Lapshear Stress (PSI) | Std. Dev. (PSI) | No. Cohesive Failures | Failure Type |
|---|---|---|---|---|
| 9 | 73.9 | 22.4 | 0/3 | Adhesive Failure |
| 10 | 198 | 73.3 | 0/4 | Adhesive Failure |
| 11 | 0 | 0 | 0/2 | N/A |
| 12 | 1624 | 56.5 | 4/4 | Specimen Break |
| 13 | 708 | 108 | 4/4 | Cohesive Failure |
| 14 | 956 | 464 | 3/3 | Cohesive Failure |
| 15 | 1560 | 173 | 3/4 | Specimen Break |
| 16 | 652 | 368 | 0/4 | Adhesive Failure |
| 17 | 642 | 229 | 3/3 | Cohesive Failure |
| 18 | 1170 | 353 | 4/4 | Cohesive Failure |
| 19 | 1450 | 128 | 4/4 | Specimen Break |
| 20 | 1370 | 67.8 | 5/5 | Specimen Break |
| 21 | 1540 | 185 | 5/5 | Specimen Break |
| 22 | 1560 | 84.7 | 5/5 | Specimen Break |

Comparison of the lap shear stress measurements of Sample Sets 9-11 demonstrates that lap shear samples having a laser-etched (e.g. textured) stainless steel substrate had improved overmold composition adhesion to the metal substrate. In particular, lap shear samples from Sample Set 11 failed to adhere to the metal substrate under any measurable stress while lap shear samples from Sample Sets 9 and 10 exhibited a lap shear stress at break of about 73.9 psi and about 198 psi, respectively. However, comparison of lap shear samples of Sample Set 9 with those of Sample Set 1 suggest that PAEK2 overmold composition had improved adhesion to bare aluminum relative to bare stainless steel.

Comparison of the lap shear stress measurement of Samples Set 11-17 demonstrate that lap shear samples having adhesive compositions had relatively high levels of adhesions. In particular, the lap shear samples of Sample Set 11 (no adhesive composition) did not have a measurable lap shear stress at break, due to poor adhesion of the overmold composition to the metal substrate. On the other hand, the lap shear samples of Sample Sets 12-17 had a lap shear stress at break of between about 56.5 psi and about 464 psi. It is noted that while the lap shear samples of Sample Set 12 had the lowest lap shear stress at break, the failure under stress was specimen break, indicating that the P1 failed before the adhesive junction between P1 and the metal substrate.

Comparison of Sample Sets 10 and 18 to 22 demonstrated that, for the lap shear samples tested, polysulfone adhesive compositions can significantly improve the adhesion of PAEK/PAES blends to metal over a wide range of $SO_2$ concentrations. In particular, comparison of the lap shear stresses of Sample Set 10 with those of 18-22 demonstrate that over a range of adhesive composition $SO_2$ concentrations ranging from 5.7% to 11.7%, the lap shear samples had significantly improved adhesion between the PAEK2 overmold composition and the metal.

The embodiments above are intended to be illustrative and not limiting.

Additional embodiments are within the inventive concepts. In addition, although the present invention has be described with reference to particular embodiments, those skilled in the art will recognized that changes can be made in form and detail without departing form the spirit and scope of the invention. Any incorporation by reference of documents above is limited such that no subject matter is incorporated that is contrary to the explicit disclosure herein.

Example 6—Further Adhesion of Overmold Compositions to Aluminum

This Example demonstrates the adhesion of additional PAEK2 overmold compositions to aluminum 6061 substrates using poly(aryl ether) adhesive compositions.

The overmold compositions (including PAEK2) used in the Example is displayed in TABLE 6. The source of the glass fiber in each composition was from the Ketaspire® PEEK KT 880 GF 30 composition. Victrex® HT™ G22 was obtained from Victrex PLC, Thornton Cleveleys, United Kingdom.

TABLE 6

| Overmold Composition | Source | P6 (wt. %) |
|---|---|---|
| PEK | Victrex ® HT ™ G22 | 70.0 |
| Glass Fiber | | 30.0 |

To demonstrate adhesion, three sample sets were formed. In particular, each sample set included a set of 2 (Sample Set 1A) or 3 (Sample Set 2A) and 4 (Sample Set 3A) replicate lap shear samples as described above, and was formed with aluminum 6061 substrates. After laser etching, the substrates were rinsed in acetone and dried in a vacuum oven at 50° C. For each lap shear sample, the overmold composition was P6. The PAEK2 composition was then injected, into the mold, at a temperature ranging from about 400° C. to about 410° C. to form the lap shear samples. The lap shear sample was removed from the mold and allowed to cool to room temperature. Sample Set 1A was formed without an adhesive composition. For Sample Sets 2A and 3A, the adhesive compositions were AC 2 and 5, respectively.

Following formation, the lap shear stress of the lap shear samples in each Sample Set was determined as described above. Sample Set parameters and results of the lap shear stress measurements are displayed in TABLE 7, below. Furthermore, the lap shear stress values listed in TABLE 7 are averaged over the number of lap shear samples in the corresponding Sample Set.

TABLE 7

| Sample Set/ Adhesive Composition | % SO2 in Adhesive Composition | Td 5% loss (° C.) | Lapshear Stress (psi) | Std. dev. (psi) | No. Cohesive Failures | Failure Type |
|---|---|---|---|---|---|---|
| 1A/None | None | N/A | 388 | 56.3 | 0/2 | adhesive |
| 2A/AC2 | 14.4 | 499 | 980 | 76 | 3/3 | Specimen break |
| 3A/AC5 | 0.0 | 498 | 1050 | 133 | 4/4 | Specimen break |

Referring to TABLE 7, the results demonstrate that for the lap shear samples tested, adhesive compositions including amorphous poly(aryl ether ketone)s and poly(aryl ether sulfone)s significantly improve the adhesion of PAEK2 overmold compositions to aluminum.

Example 7: Preparation of PEEK-PEDEK 70/30

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 129.80 g of diphenyl sulfone, 18.942 g of hydroquinone, 13.686 g of 4,4'biphenol and 54.368 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.876 g of $Na_2CO_3$ and 0.1524 g of $K_2CO_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone were added to the reaction mixture while keeping a nitrogen purge on the reactor. After 5 minutes, 0.418 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 73 g of a white powder, with a melt viscosity of 194 Pa-s (0.19 $kNs/m^2$) measured at a temperature of 400° C. and a shear rate of 1000 $s^{-1}$ using a tungsten carbide die 0.5×3.175 mm.

The final powder was then ground in an attrition mill successively through a 500 μm, 250 and 125 μm screen and then sieved through a 106 μm screen.

Example 8: Preparation of PEEK-PEDEK 75/25

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 128.21 g of diphenyl sulfone, 20.295 g of hydroquinone, 11.405 g of 4,4'biphenol and 54.368 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.876 g of $Na_2CO_3$ and 0.169 g of $K_2CO_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone were added to the reaction mixture while keeping a nitrogen purge on the reactor. After 5 minutes, 0.418 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder with a melt viscosity of 150 Pa-s (0.15 $kNs/m^2$) measured at a temperature of 400° C. and a shear rate of 1000 $s^{-1}$ using a tungsten carbide die 0.5×3.175 mm.

The final powder was then ground in an attrition mill successively through a 500 μm, 250 and 125 μm screen and then sieved through a 106 μm screen.

Example 9: Preparation of PEEK-PEDEK 80/20

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 129.83 g of diphenyl sulfone, 22.196 g of hydroquinone, 9.355 g of 4,4'biphenol and 55.305 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.625 g of $Na_2CO_3$ and 0.694 g of $K_2CO_3$ was added via a powder dispenser to the reaction mixture over 30 minutes. At the end of the addition, the reaction mixture was heated to 320° C. at 1° C./minute. After 4 minutes at 320° C., 6.577 g of 4,4'-difluorobenzophenone were added to the reaction mixture while keeping a nitrogen purge on the reactor. After 5 minutes, 1.285 g of lithium chloride were added to the reaction mixture. 10 minutes later, another 2.192 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 72 g of a white powder with a melt viscosity of 203 Pa-s (0.20 $kNs/m^2$) measured at a temperature of 400° C. and a shear rate of 1000 $s^{-1}$ using a tungsten carbide die 0.5×3.175 mm.

The final powder was then ground in an attrition mill successively through a 500 μm, 250 and 125 μm screen and then sieved through a 106 μm screen.

Example 10—Adhesion Evaluated by 90 Degree Peel Test

Aluminum 1100, stainless steel 304, and copper 110 were obtained in shim stocks 0.005" thick. Each metal was cleaned with isopropanol and acetone to remove residual oils, greases, and other surface contaminants prior to preparing test specimens. Each metal type was evaluated as a smooth metal sample and an additional sample group was prepared by anodizing the aluminum surface.

Aluminum for anodization followed a similar procedure described in ASTM D3933. The surface of the aluminum shim was roughened prior to treatment with a 220 grit SiC pad and rinsed with methanol. A five minute 10% sodium hydroxide solution soak, followed by a five minute soak in 40° C. deionized water, and a deionized water rinse was used to treat the sample. Then, a 10% phosphoric acid solution was used with an applied voltage from a two volt/min ramp to seven volts for nine minutes. A five minute soak in 40° C. deionized water wash and deionized water rinse followed the phosphoric acid treatment. The 10% phosphoric acid treatment was repeated, but at three volts per minute to 15V for 20 minutes. The five minute soak in 40° C. deionized water wash and deionized water rinse was performed again following the phosphoric acid treatment. The aluminum sample was dried at 75° C. for 30 minutes and used within 72 hours.

PEEK (AC12) was applied to aluminum and stainless steel shims by powder coating. PEEK-PEDEK (AC13-15) and PEKK (AC11) was applied to anodized aluminum, aluminum, and stainless steel shims by powder coating using fine powder with at least 98% particles passing through a 106 μm screen. The coating was applied using an electrostatic powder coater to apply a 40 micron average thick coating. The coating was then subjected to a heat treatment at a temperature greater than its glass transition temperature for amorphous polymers and greater than its melt temperature for semicrystalline polymers. In this evaluation, a temperature of 400° C. for one hour was utilized for powder coated samples.

Select samples of PPSU (AC3), PSU (AC9), poly(ether bisphenol A ketone) (AC5), and PEEK-PEDEK (AC13-15) were applied to metal shims by draw down technique. A 20% solution in NMP was used for coating PPSU, PSU, and poly(ether bisphenol A ketone). A 10% solution in a 40/60 mixture of trifluoroacetic acid/dichloromethane was used for PEEK-PEDEK and PEKK.

Coating conditions for PPSU (AC3) and PSU (AC9) on anodized aluminum started with a preheat of the metal substrate at 120° C. for 10 minutes. The coating was applied with a 50 micron roller bar and allowed to dry at 120° C. for 30 minutes before drying at 120° C. under vacuum overnight.

Coating conditions for PPSU (AC3), PSU (AC9), and poly(ether bisphenol A ketone) (AC5) on aluminum and stainless steel followed a similar procedure using a 120° C. 10 minutes preheat followed heat treatment at 150° C. for 50 minutes and an additional heat treatment at 250° C. for 20 minutes in a muffle furnace.

Coating conditions for PEEK-PEDEK (AC13-15) and PEKK (AC11) were applied on copper without a preheated shim, dried at 100° C. for 50 minutes, and subjected to 250° C. for 20 minutes in a muffle furnace.

Samples were overmolded with PEEK (KT-880 GF30, Solvay SSP). Each overmolded sample was approximately 2×3×0.125 inches. A Mini-jector injection molding machine was used for overmolding. Conditions for the process include a temperature profile of: 393° C. front and rear, 399° C. nozzle, 171° C. mold, 530 psi pressure, 2 second injection time, and 20 second cycle time.

The edges of the metal shim on each sample were removed to accommodate the testing configuration on the Instron test frame. This setups produces a sample 1.5 inches wide. The first 0.5 inch of sample length was sacrificed for gripping in the tensile frame, leaving 2.5 inch length to collect data from. The test specimen was at 90 degrees from the pulling direction of the metal shim and tested at a strain rate of two inches per minute. The first and last 0.2-0.3 inches of data test data were not included in the data analysis. The remaining two inches of peel length were used to measure the average load to quantify the adhesion strength and the results are reported below.

TABLE 8 demonstrates that the use of an adhesive tie layer using PEEK-PEDEK, PEKK, PPSU, and PSU on anodized aluminum improves the adhesion, demonstrated by the increase in peel strength. TABLE 9, 10, and 11, similarly show improved adhesion on aluminum, stainless steel, and copper, respectively. TABLE 9 shows PEEK, PEEK-PEDEK, PEKK, PPSU, PSU, and poly(ether bisphenol A ketone) as effective adhesive tie layers on aluminum. TABLE 10 shows PEEK, PEEK-PEDEK, and PEKK as effective adhesive tie layers on stainless steel. TABLE 11 shows PEEK-PEDEK and PEKK as effective adhesive tie layers on copper.

TABLE 8

| Sample Set | Adhesive Composition | Td 5% loss (° C.) | Overmold Composition | Peel Strength (lb) | Std. Dev. (lb) |
| --- | --- | --- | --- | --- | --- |
| 23 | None | N/A | P0 | 18.4 | 3.2 |
| 24 | AC13 | 565 | P0 | 28.9 | 2.0 |
| 25 | AC14 | 566 | P0 | 38.4 | 13.3 |
| 26 | AC15 | 565 | P0 | 33.6 | 7.7 |
| 27 | AC11 | 520 | P0 | 33.4 | 15 |
| 28 | AC9 | 499 | P0 | 33.6 | 1.4 |
| 29 | AC3 | 537 | P0 | 20.8 | 1.4 |

TABLE 9

| Sample Set | Adhesive Composition | Td 5% loss (° C.) | Overmold Composition | Peel Strength (lb) | Std. Dev. (lb) |
| --- | --- | --- | --- | --- | --- |
| 30 | None | N/A | P0 | 0 | 0 |
| 31 | AC12 | 548 | P0 | 16.8 | 1.4 |
| 32 | AC13 | 565 | P0 | 14.0 | 1.7 |
| 33 | AC14 | 566 | P0 | 12.9 | 1.4 |
| 34 | AC15 | 565 | P0 | 11.6 | 1.3 |
| 35 | AC11 | 520 | P0 | 10.0 | 1.0 |
| 36 | AC9 | 499 | P0 | 11.3 | 1.0 |
| 37 | AC3 | 537 | P0 | 4.9 | 1.3 |
| 38 | AC5 | 498 | P0 | 15.8 | 2.0 |

TABLE 10

| Sample Set | Adhesive Composition | Td 5 % loss (° C.) | Overmold Composition | Peel Strength (lb) | Std. Dev. (lb) |
| --- | --- | --- | --- | --- | --- |
| 39 | None | N/A | P0 | 0 | 0 |
| 40 | AC12 | 548 | P0 | 4.6 | 2.0 |
| 41 | AC13 | 565 | P0 | 1.3 | 0.5 |
| 42 | AC14 | 566 | P0 | 3.5 | 1.0 |
| 43 | AC15 | 565 | P0 | 4.3 | 2.8 |
| 44 | AC11 | 520 | P0 | 1.0 | 0.2 |

TABLE 11

| Sample Set | Adhesive Composition | Td 5% loss (° C.) | Overmold Composition | Peel Strength (lb) | Std. Dev. (lb) |
| --- | --- | --- | --- | --- | --- |
| 45 | None | N/A | P0 | 0 | 0 |
| 46 | AC13 | 565 | P0 | 2.6 | 0.2 |
| 47 | AC14 | 566 | P0 | 1.5 | 0.2 |
| 48 | AC15 | 565 | P0 | 1.3 | 0.2 |
| 49 | AC11 | 520 | P0 | 1.3 | 0.1 |

The invention claimed is:

1. A polymer-metal junction comprising:
a polymer composition disposed over a surface of a metal substrate, and
a second adhesive composition disposed between the polymer composition and the metal surface and in contact with the polymer composition and the surface of the metal substrate,
wherein the polymer composition comprises a first poly (aryl ether ketone) and the adhesive composition comprises a poly(aryl ether).

2. The polymer-metal junction of claim 1, wherein the poly(aryl ether) is a poly(aryl ether sulfone) or a second poly(aryl ether ketone).

3. The polymer-metal junction of claim 1, wherein the poly(aryl ether) comprises repeat units represented by formula (A):

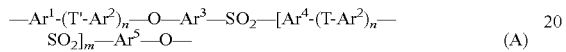   (A)

wherein:
Ar$^1$, Ar$^2$, Ar$^3$, Ar$^4$, and Ar$^5$, equal to or different from each other and at each occurrence, are independently an aromatic mono- or polynuclear group;

(C)

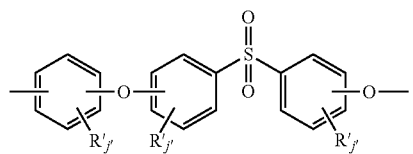

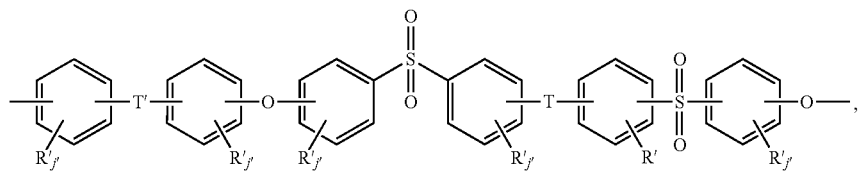

T and T', equal to or different from each other and at each occurrence, are independently a bond or a divalent group optionally including one or more than one heteroatom; and
n and m, equal to or different from each other, are independently zero or an integer from 1 to 5.

4. The polymer-metal junction of claim 3, wherein Ar$^1$, Ar$^2$, Ar$^3$, Ar$^4$ and Ar$^5$ are equal or different from each other and are represented by a formula selected from following group of formulae:

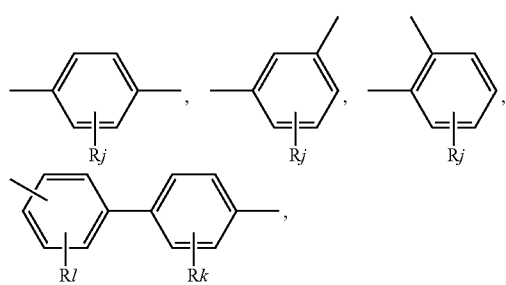

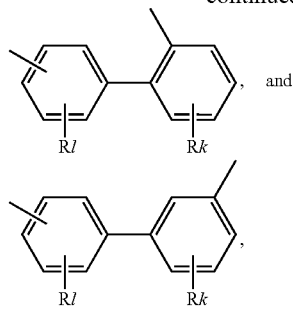

wherein each R is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium, and where j, k, and l, equal or different from each other, are independently 0, 1, 2, 3 or 4.

5. The polymer-metal junction of claim 1, wherein the poly(aryl ether) comprises repeat units represented a formula selected from the group of formulae:

(D)

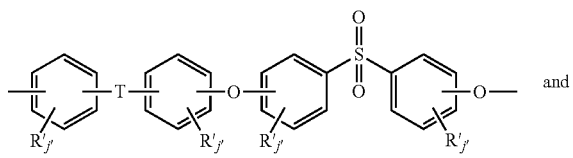 and (E)

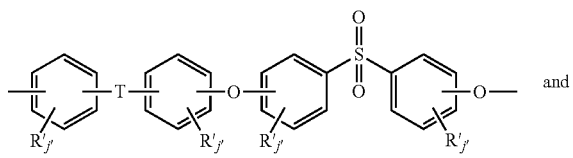

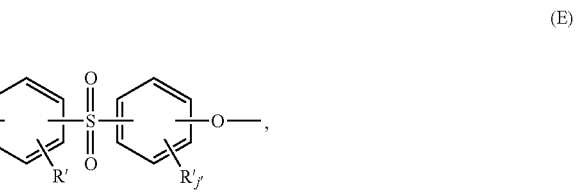

wherein,
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;
j' is 0 to 4; and
T and T', equal to or different from each other, is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—, where each R$^a$ and R$^b$, independently of one another, is a hydrogen or a C$_1$-C$_{12}$-alkyl, C$_1$-C$_{12}$-alkoxy, or C$_6$-C$_{18}$-aryl group; —(CH$_2$)$_n$— and —(CF$_2$)$_n$— with n being an integer from 1 to 6; an aliphatic divalent group, linear or branched, of up to 6 carbon atoms; and combinations thereof.

6. The polymer-metal junction of claim 1, wherein the poly(aryl ether) comprises repeat units represented by a formula selected from the following group of formulae:

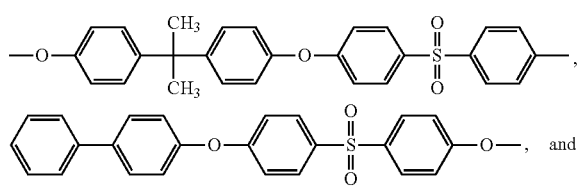
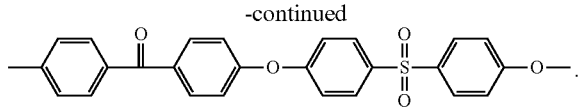
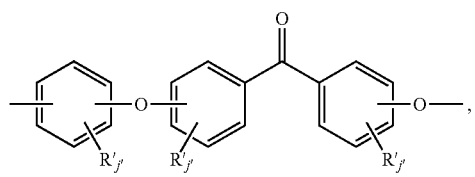, and
7. The polymer-metal junction of claim 1, wherein the poly(aryl ether) comprises repeat units represented by a formula selected from the following group of formulae:
(J-A)
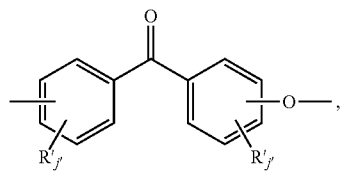
(J-B)
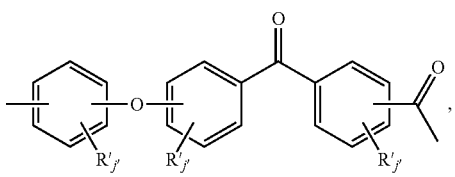
(J-C)
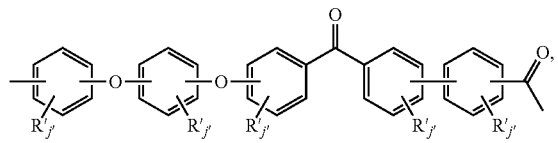
(J-D)
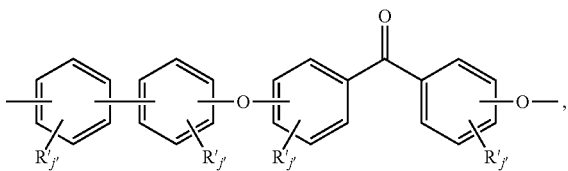
(J-E)
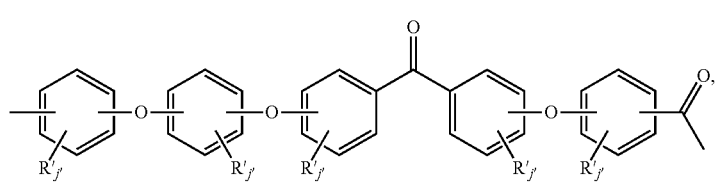
(J-F)
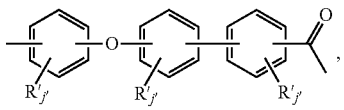
(J-G)
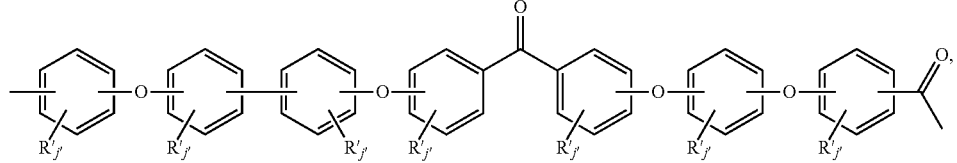
(J-H)
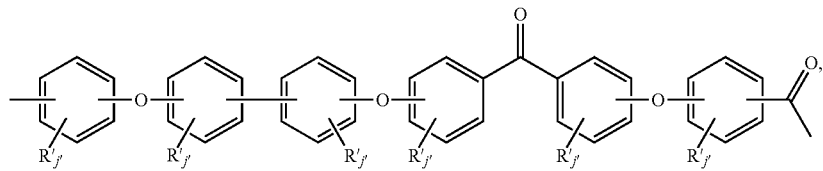
(J-I)
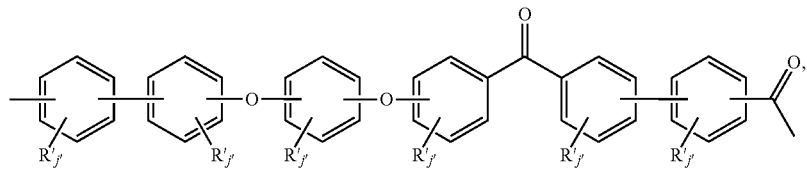
(J-J)

-continued

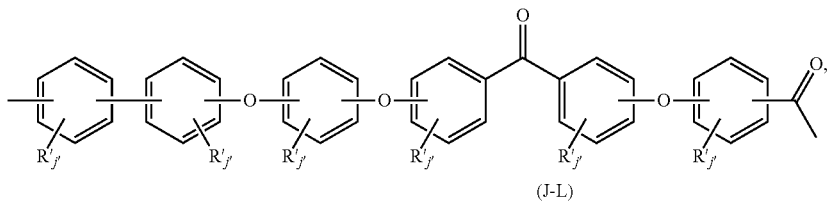

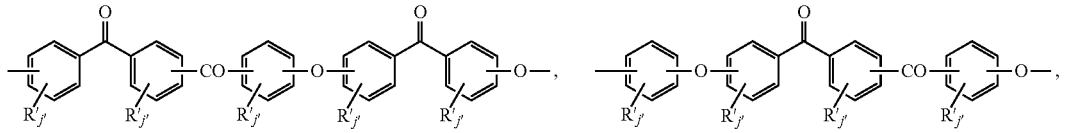

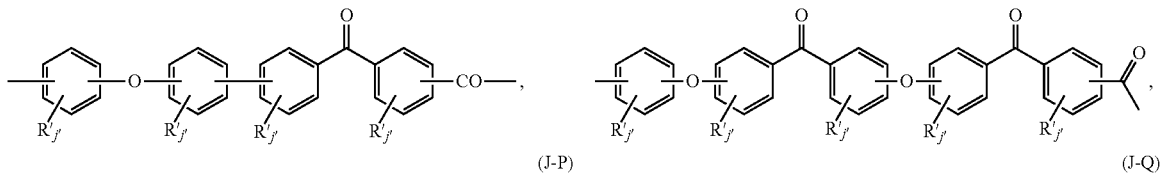

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and wherein j' is 0 to 4, and T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—, where each R$^a$ and R$^b$, independently of one another, is a hydrogen or a C$_1$-C$_{12}$-alkyl, C$_1$-C$_{12}$-alkoxy, or C$_6$-C$_{18}$-aryl group; —(CH$_2$)$_n$— and —(CF$_2$)$_n$— with n being an integer from 1 to 6; an aliphatic divalent group, linear or branched, of up to 6 carbon atoms; and combinations thereof.

8. A wire or cable comprising the polymer-metal junction of claim 1, wherein the substrate comprises a metal core, the polymer composition comprises a sheath surrounding a first portion of the length of the core, and the adhesive composition surrounds a second portion of the length of the core, the same or different from the first portion, and is disposed between a portion of the polymer composition and the core, or wherein the substrate comprises a metal core, the polymer composition comprises a sheath surrounding a portion of the length of the core, and the adhesive composition is disposed between at least a portion of the polymer composition and the core.

9. The polymer-metal junction of claim 1, wherein the adhesive composition is amorphous.

10. The polymer-metal junction of claim 1, wherein the adhesive composition has 25 wt. % or less of sulfone groups of formula:

[—S(=O)$_2$—]

based on the total weight of the poly(aryl ether).

11. The polymer-metal junction of claim 1, wherein the adhesive composition forms a layer on at least a portion of the surface of the metal substrate.

12. The polymer-metal junction of claim 1, wherein the polymer composition is overmolded at least a portion of the adhesive composition and at least a portion of the surface of the metal substrate.

13. A method for providing improved adhesion between a polymer composition and a metal substrate, the method comprising:
depositing an adhesive composition comprising a poly (aryl ether) on a surface of a metal substrate to form a first deposit; and
depositing a polymer composition comprising a first poly (aryl ether ketone) on the first deposit to form a second deposit.

14. The method of claim 13, wherein the poly(aryl ether) is a poly(aryl ether sulfone) or a second poly(aryl ether ketone).

15. The method of claim 13, wherein the poly(aryl ether) comprises repeat units represented by formula (A):

—Ar$^1$-(T'-Ar$^2$)$_n$—O—Ar$^3$—SO$_2$—[Ar$^4$-(T-Ar$^2$)$_n$—SO$_2$]$_m$—Ar$^5$—O—  (A)

wherein
Ar$^1$, Ar$^2$, Ar$^3$, Ar$^4$, and Ar$^5$, equal to or different from each other and at each occurrence, are independently an aromatic mono- or polynuclear group;

T and T', equal to or different from each other and at each occurrence, are independently a bond or a divalent group optionally including one or more than one heteroatom; and n and m, equal to or different from each other, are independently zero or an integer from 1 to 5.

16. The method of claim 15, wherein $Ar^1$, $Ar^2$, $Ar^3$, $Ar^4$ and $Ar^5$ are equal or different from each other and are represented by a formula selected from following group of formulae:

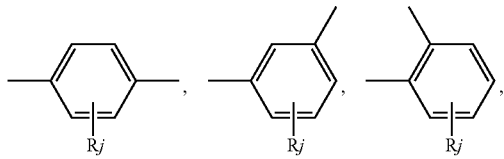

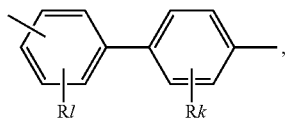

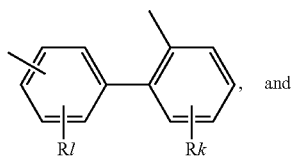, and

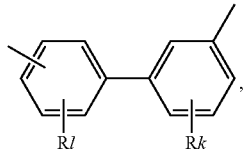, wherein each R is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium, and where j, k, and l, equal or different from each other, are independently 0, 1, 2, 3 or 4.

17. The method of claim 13, wherein the poly(aryl ether) comprises repeat units represented a formula selected from the group of formulae:

wherein, each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;

j' is 0 to 4; and

T and T', equal to or different from each other, is selected from the group consisting of a bond, —$CH_2$—; —O—; —$SO_2$—; —S—; —C(O)—; —C($CH_3$)$_2$—; —C($CF_3$)$_2$—; —C(=$CCl_2$)—; —C($CH_3$)($CH_2CH_2COOH$)—; —N=N—; —$R^aC$=$CR^b$—, where each $R^a$ and $R^b$, independently of one another, is a hydrogen or a $C_1$-$C_{12}$-alkyl, $C_1$-$C_{12}$-alkoxy, or $C_6$-$C_{18}$-aryl group; —($CH_2$)$_n$— and —($CF_2$)$_n$— with n being an integer from 1 to 6; an aliphatic divalent group, linear or branched, of up to 6 carbon atoms; and combinations thereof.

18. The method of claim 13, wherein the poly(aryl ether) comprises repeat units represented by a formula selected from the following group of formulae:

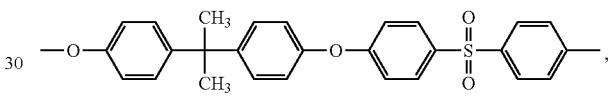

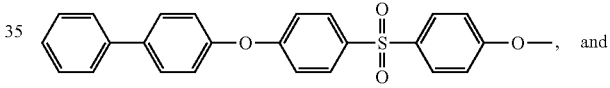, and

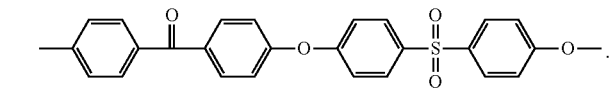.

19. The method of claim 13, wherein the poly(aryl ether) comprises repeat units represented by a formula selected from the following group of formulae:

(C)

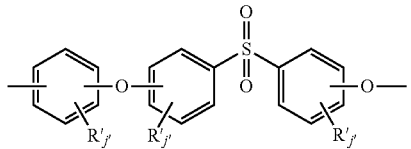

(D)

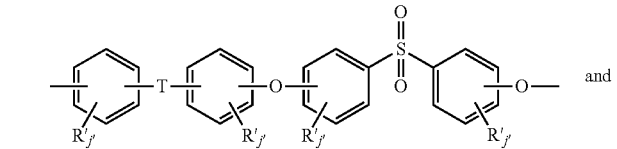

and (E)

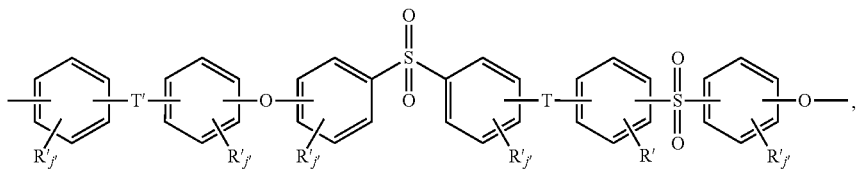,

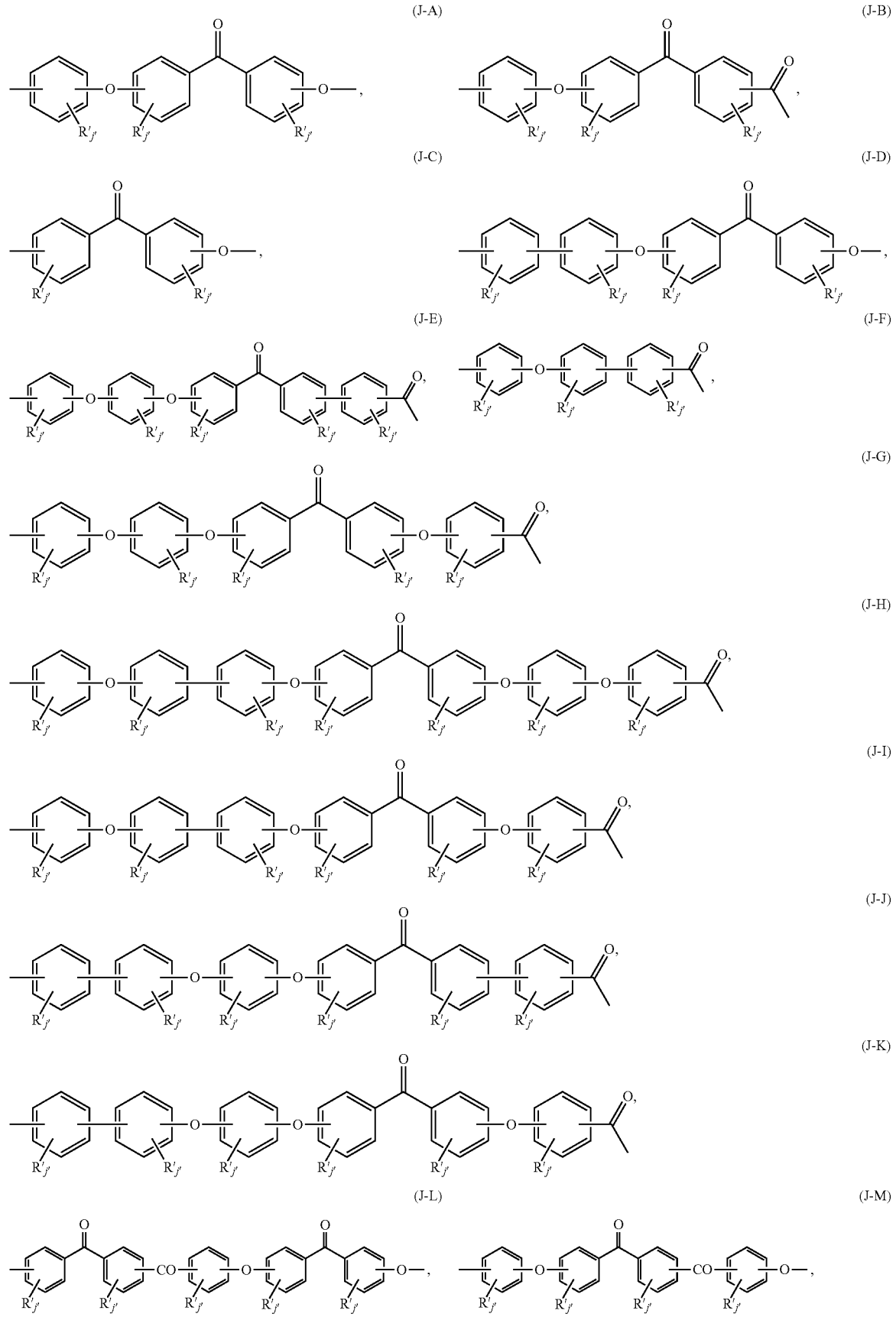

-continued

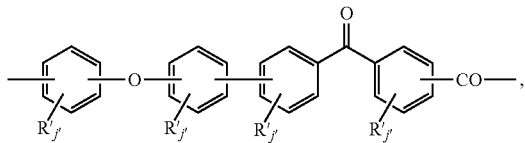 (J-N)

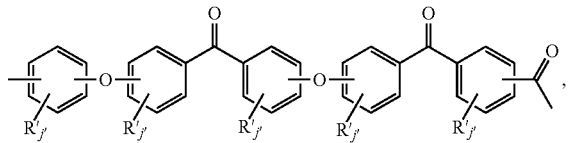 (J-O)

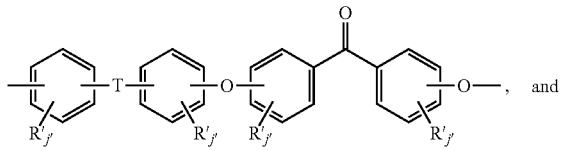 (J-P)

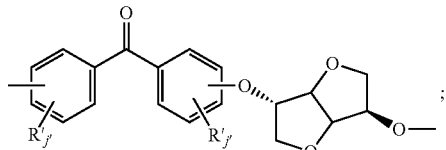 (J-Q)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and wherein j' is 0 to 4, and T is selected from the group consisting of a bond, —$CH_2$—; —O—; —$SO_2$—; —S—; —C(O)—; —C($CH_3$)$_2$—; —C($CF_3$)$_2$—; —C(=$CCl_2$)—; —C($CH_3$)($CH_2CH_2COOH$)—; —N=N—; —$R^a$C=$CR^b$—, where each $R^a$ and $R^b$, independently of one another, is a hydrogen or a $C_1$-$C_{12}$-alkyl, $C_1$-$C_{12}$-alkoxy, or $C_6$-$C_{18}$-aryl group; —($CH_2$)$_n$— and —($CF_2$)$_n$— with n being an integer from 1 to 6; an aliphatic divalent group, linear or branched, of up to 6 carbon atoms; and combinations thereof.

\* \* \* \* \*